(12) United States Patent
Shimada

(10) Patent No.: US 8,917,313 B2
(45) Date of Patent: Dec. 23, 2014

(54) IMAGE CAPTURING APPARATUS AND IMAGE CAPTURING METHOD

(71) Applicant: Sony Corporation, Tokyo (JP)

(72) Inventor: Junji Shimada, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/190,598

(22) Filed: Feb. 26, 2014

(65) Prior Publication Data

US 2014/0176670 A1 Jun. 26, 2014

Related U.S. Application Data

(63) Continuation of application No. 12/928,287, filed on Dec. 8, 2010, now Pat. No. 8,723,918.

(30) Foreign Application Priority Data

Dec. 15, 2009 (JP) ................................ P2009-283764
Feb. 5, 2010 (JP) ................................ P2010-024042

(51) Int. Cl.
*H04N 5/228* (2006.01)
*H04N 5/232* (2006.01)
*G03B 37/00* (2006.01)
*H04N 13/00* (2006.01)

(52) U.S. Cl.
CPC ....... *H04N 5/23238* (2013.01); *H04N 5/23264* (2013.01); *H04N 5/23248* (2013.01); *H04N 5/23258* (2013.01); *H04N 5/232* (2013.01); *H04N 2013/0088* (2013.01); *H04N 5/23216* (2013.01); *H04N 5/23251* (2013.01); *H04N 5/23245* (2013.01); *G03B 37/00* (2013.01)
USPC ....... 348/36; 348/39; 348/208.4; 348/208.99; 348/208.3

(58) Field of Classification Search
CPC ........................... H04N 5/23238; H04N 5/232
USPC ............................................................ 348/36
See application file for complete search history.

(56) References Cited

U.S. PATENT DOCUMENTS 671,154 A * 4/1901 Angsten ........................ 396/20
1,967,468 A * 7/1934 Douglass ...................... 352/69

(Continued)

FOREIGN PATENT DOCUMENTS

CN 101263707 A 9/2008
CN 101317445 A 12/2008

(Continued)

OTHER PUBLICATIONS

Office Action from Chinese Application No. 201010578548.6, dated Mar. 25, 2014.

(Continued)

*Primary Examiner* — Sath V Perungavoor
*Assistant Examiner* — Matthew J Anderson
(74) *Attorney, Agent, or Firm* — Lerner, David, Littenberg, Krumholz & Mentlik, LLP

(57) ABSTRACT

An image capturing apparatus includes a driving unit for displacing one of a lens unit and an imaging device with respect to an optical axis, and a controller for causing the driving unit to displace one of the lens unit and the imaging device, in response to the motion of the image capturing apparatus. When, with a shooting direction being moved, captured images are generated so that a panoramic image is generated from the captured images, the controller displaces the position of the lens unit or the imaging device at the start of exposure of each image to be captured in a direction based on a direction in which the shooting direction is moved. In addition, a displacement amount at the start of the exposure is set in response to the length of an exposure time period so that the displacement during the exposure time period becomes small and the quality of an image is improved.

20 Claims, 19 Drawing Sheets

(56) References Cited

U.S. PATENT DOCUMENTS

| | | | |
|---|---|---|---|
| 2,258,903 A * | 10/1941 | Mitchell | 359/478 |
| 3,218,114 A * | 11/1965 | Grey | 352/44 |
| 3,712,199 A | 1/1973 | Songer, Jr. | |
| 5,030,984 A * | 7/1991 | Buckler et al. | 396/153 |
| 5,278,608 A | 1/1994 | Taylor et al. | |
| 5,416,557 A | 5/1995 | Nagasaki et al. | |
| 5,903,303 A * | 5/1999 | Fukushima et al. | 348/47 |
| 6,192,196 B1 | 2/2001 | Keller | |
| 6,211,911 B1 | 4/2001 | Komiya et al. | |
| 6,747,686 B1 | 6/2004 | Bennett | |
| 7,129,971 B2 | 10/2006 | McCutchen | |
| 7,177,538 B2 * | 2/2007 | Sato et al. | 396/55 |
| 7,317,486 B2 * | 1/2008 | Toyofuku et al. | 348/333.11 |
| 7,456,864 B2 * | 11/2008 | Soga | 348/218.1 |
| 7,474,848 B2 * | 1/2009 | Gennetten et al. | 396/234 |
| 7,486,318 B2 | 2/2009 | Ohki | |
| 7,724,286 B2 | 5/2010 | Shioya et al. | |
| 7,742,076 B2 | 6/2010 | Seo et al. | |
| 7,783,191 B2 * | 8/2010 | Furumochi | 396/263 |
| RE42,033 E * | 1/2011 | Liu et al. | 250/234 |
| 8,023,000 B2 | 9/2011 | Tamaru | |
| 8,120,669 B2 | 2/2012 | Meitav et al. | |
| 8,154,607 B2 * | 4/2012 | Ozluturk | 348/208.7 |
| 8,203,597 B2 | 6/2012 | Wang et al. | |
| 8,217,989 B2 * | 7/2012 | Kim et al. | 348/37 |
| 8,218,055 B2 * | 7/2012 | Naito | 348/333.04 |
| 8,223,214 B2 * | 7/2012 | Toguchi | 348/211.9 |
| 8,284,262 B2 | 10/2012 | Tanaka | |
| 8,330,824 B2 | 12/2012 | Hashi et al. | |
| 8,350,892 B2 * | 1/2013 | Hayashi | 348/36 |
| 8,355,042 B2 | 1/2013 | Lablans | |
| 2003/0081191 A1 | 5/2003 | Nishi et al. | |
| 2005/0237631 A1 | 10/2005 | Shioya et al. | |
| 2006/0013578 A1 | 1/2006 | Sato et al. | |
| 2007/0139547 A1 | 6/2007 | Horiuchi | |
| 2007/0253696 A1 | 11/2007 | Nakajima et al. | |
| 2008/0247745 A1 * | 10/2008 | Nilsson | 396/322 |
| 2009/0167879 A1 * | 7/2009 | Ohno | 348/208.12 |
| 2009/0231708 A1 | 9/2009 | Shibata et al. | |
| 2010/0149358 A1 * | 6/2010 | Shioya et al. | 348/218.1 |
| 2010/0253763 A1 | 10/2010 | Shioya et al. | |

FOREIGN PATENT DOCUMENTS

| | | |
|---|---|---|
| CN | 101387733 A | 3/2009 |
| JP | 06-225202 | 8/1994 |
| JP | 11-088754 A | 3/1999 |
| JP | 2000-184265 A | 6/2000 |
| JP | 2001-285702 A | 10/2001 |
| JP | 2005-328497 A | 11/2005 |
| JP | 2005-333396 A | 12/2005 |
| JP | 2007-214620 A | 8/2007 |
| JP | 2008-271529 A | 11/2008 |
| JP | 4293053 B2 | 4/2009 |
| KR | 1020070086105 A * | 8/2007 |

OTHER PUBLICATIONS

Office Action from Japanese Application No. 2010-024042, dated Dec. 3, 2013.

* cited by examiner

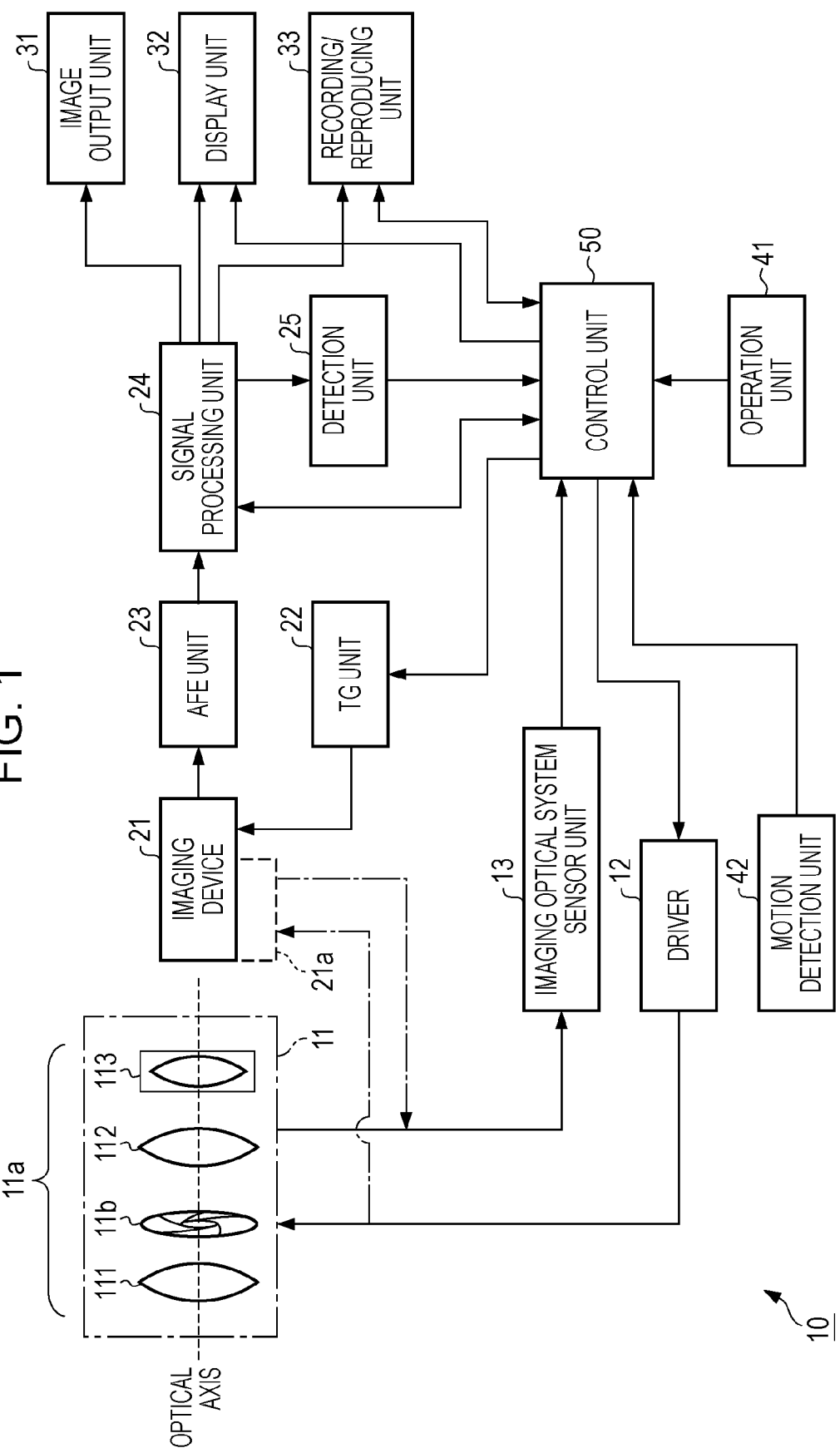

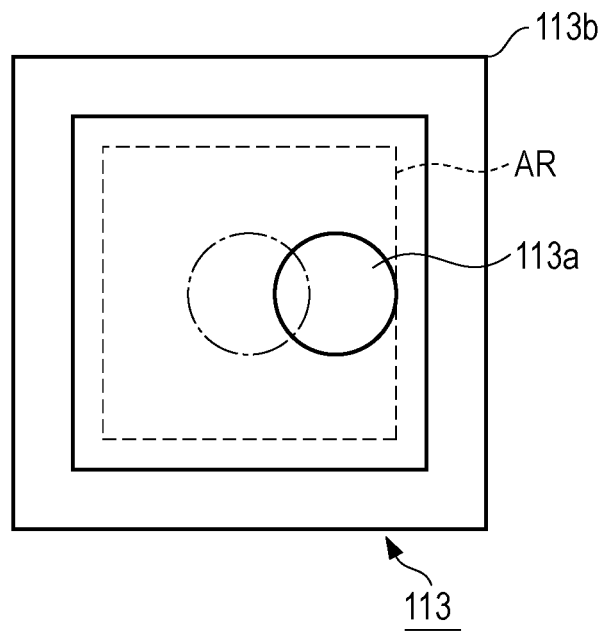
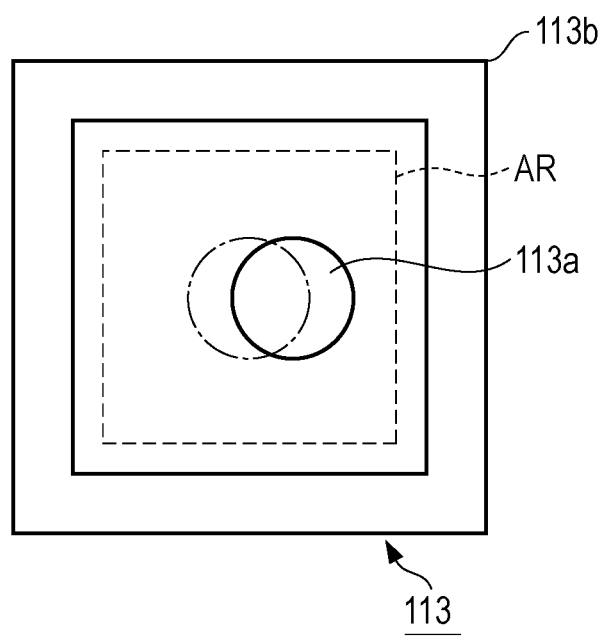

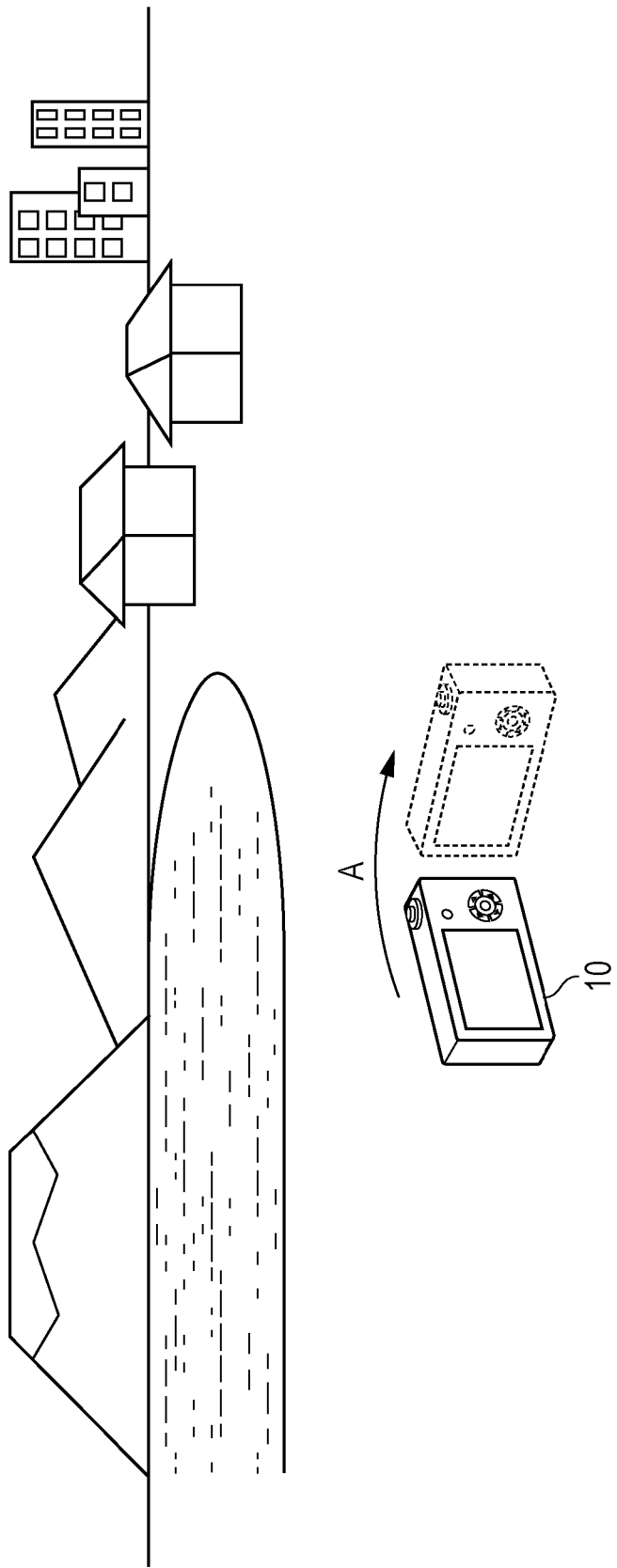

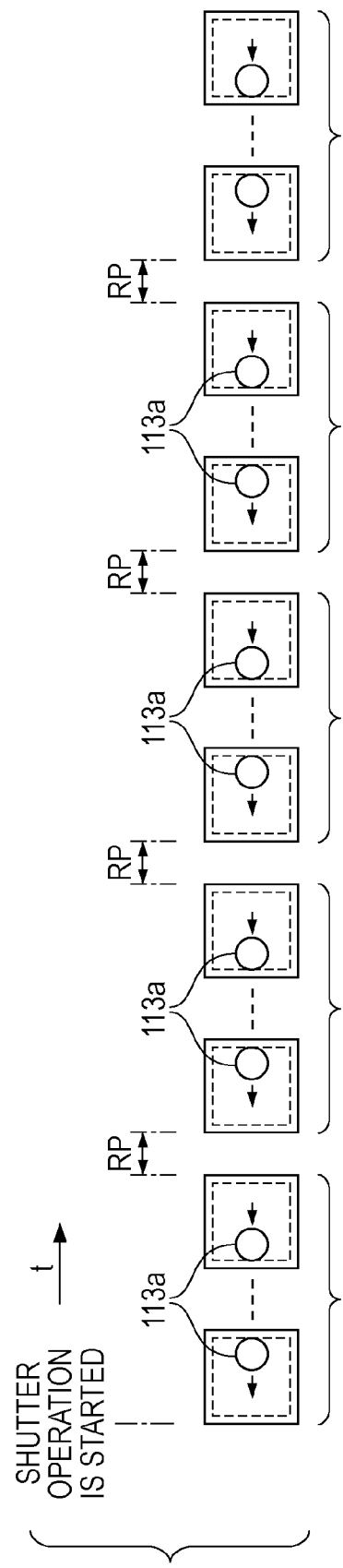
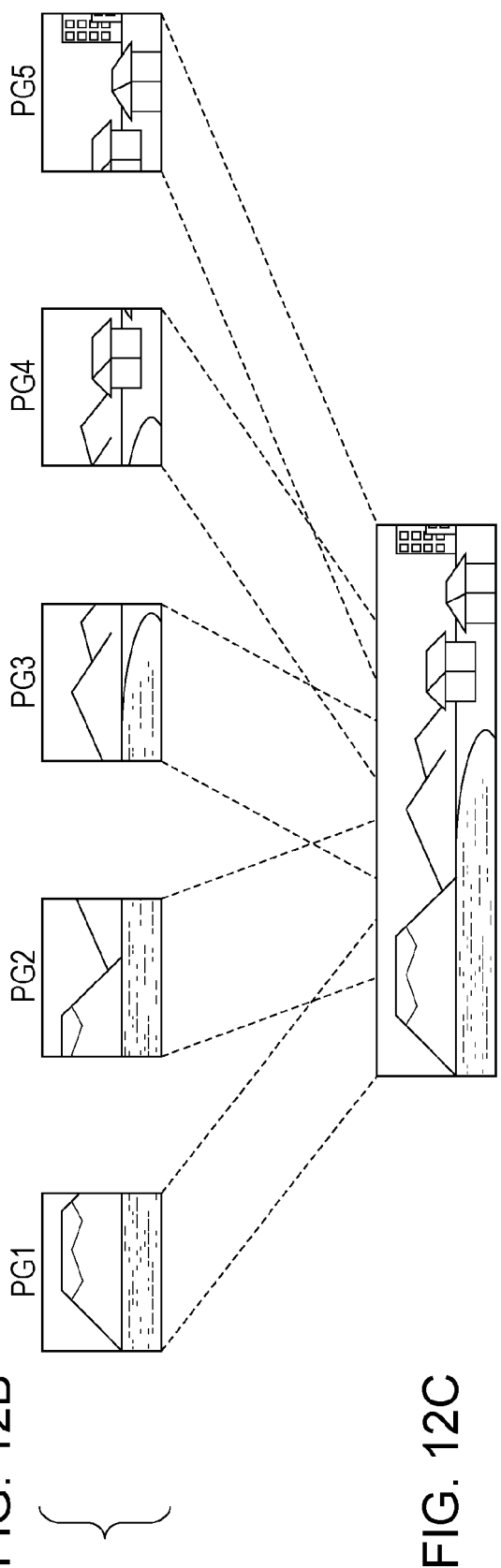
FIG. 12A
FIG. 12B
FIG. 12C

IMAGE CAPTURING APPARATUS AND IMAGE CAPTURING METHOD

CROSS-REFERENCE TO RELATED APPLICATIONS

The present application is a continuation of U.S. patent application Ser. No. 12/928,287, filed on Dec. 8, 2010, which claims priority from Japanese Patent Application No. JP 2009-283764 filed in the Japanese Patent Office on Dec. 15, 2009 and Japanese Patent Application No. JP 2010-024042 filed in the Japanese Patent Office on Feb. 5, 2010, the entire contents of which are incorporated herein by reference.

BACKGROUND OF THE INVENTION

1. Field of the Invention

The present invention relates to an image capturing apparatus and an image capturing method. For details, the present invention relates to a technique in which a plurality of captured images of good image quality, used for generating a panoramic image, can be easily obtained.

2. Description of the Related Art

In the related art, for example, in order to obtain a panoramic image using an image capturing apparatus, a technique is used in which an image capturing operation is performed with an imaging region being moved little by little, and frame (or field) images are sequentially recorded from an image capturing start point, as disclosed in Japanese Unexamined Patent Application Publication No. 11-88754. In addition, overlapping portions of captured images the positions of which are adjacent to one another are extracted from the captured images recorded, and a predetermined arithmetic processing operation is performed for the overlapping portions. Accordingly, a panoramic image is generated in which individual captured images are synthesized in a seamless manner.

For example, while moving a shooting direction in a horizontal direction, a user performs an image capturing operation, and records a plurality of captured images. By joining the captured images in a seamless manner with the overlapping portions of the captured images being subjected to a suitable processing operation, a landscape-oriented panoramic image can be obtained.

In addition, when the image capturing operation is performed with the shooting direction being moved, an operation is repeatedly performed in which the optical axis of a variable optical axis element is displaced in a direction opposite to the moving direction of the shooting direction, a shutter is opened when the optical axis is linearly moved, and the optical axis is quickly returned to an original position when the shutter is closed, and hence a plurality of captured images are recorded. In this way, even if the image capturing apparatus is quickly moved, resolution does not decrease. Accordingly, even if shutter speed is not increased, a panoramic image of good quality can be generated.

SUMMARY OF THE INVENTION

In an image capturing apparatus, a shake correction function is provided in which an optical axis is displaced in response to a shake, and hence image blurring due to the shake is prevented. However, the shake correction function is a function for preventing the image blurring due to the shake, and is not a function for generating captured images used for a panoramic image.

Consequently, according to an embodiment of the present invention, there are provided an image capturing apparatus and an image capturing method, in which a plurality of captured images of good image quality, used for generating a panoramic image, can be easily obtained.

According to an embodiment of the present invention, there is provided an image capturing apparatus including a driving unit configured to displace at least one of a lens unit and an imaging device with respect to an optical axis; and a control unit configured to cause the driving unit to displace at least one of the lens unit and the imaging device, in response to motions of the image capturing apparatus, wherein when, with a shooting direction being moved, a plurality of captured images are generated so that a panoramic image is generated from the plurality of captured images, the control unit displaces positions of the lens unit and/or the imaging device at the start of exposure of each image to be captured in a direction based on a direction in which the shooting direction is moved; and, a displacement amount at the start of the exposure is set in response to a length of an exposure time period so that the displacement during the exposure time period becomes small.

In the embodiment of the present invention, when, with the shooting direction being moved, the plurality of captured images are generated so that the panoramic image is generated from the plurality of the captured images, at least one of the lens unit and the imaging device is displaced from a position, at which the center thereof corresponds to the optical axis, in a direction, based on the direction in which the shooting direction is moved, in a plane perpendicular to the optical axis, and hence a shake correction range is enlarged. In addition, at least one of the lens unit and the imaging device is displaced from the position, at which the center thereof corresponds to the optical axis, and an exposure operation is started. In addition, during an exposure time period, the lens unit and/or the imaging device are moved in response to the motion of the image capturing apparatus, and hence a shake of an optical image formed on an imaging surface of the imaging device is corrected, the shake being due to the motion of the image capturing apparatus. Furthermore, in response to the exposure time period of the imaging device, for example, a shutter speed or a frame rate, a displacement amount for a position at the start of exposure is set. For example, when the exposure time period is short, namely, a time period for shake correction is short, the displacement amount is reduced, and hence displacement to be produced during the exposure time period is reduced. Accordingly, shake correction suitable for generating a panoramic image can be performed. Therefore, with respect to distortion, chromatic aberration, and resolution or the like, a plurality of captured images that are less degraded and have good image quality can be obtained, the plurality of captured images being used for generating the panoramic image.

According to an embodiment of the present invention, there is provided an image capturing method performed when, with a shooting direction being moved, a plurality of captured images are generated so that a panoramic image is generated from the plurality of captured images, the image capturing method including the steps of: setting a displacement amount at the start of exposure in response to a length of an exposure time period; and displacing, by the displacement amount, positions of the lens unit and/or the imaging device at the start of the exposure of each image to be captured in a direction based on a direction in which the shooting direction is moved. Accordingly, shake corrections suitable for generating a panoramic image can be performed. Therefore, with respect to distortion, chromatic aberration, and resolution or the like, a plurality of captured images that are less degraded and have good image quality can be obtained, the plurality of captured images being used for generating the panoramic image.

BRIEF DESCRIPTION OF THE DRAWINGS

FIG. 1 is a diagram illustrating a configuration of a first embodiment;

FIGS. 7A and 7B are diagrams illustrating a correction operation start position of a correction lens when a sweep direction corresponds to a right direction;

FIG. 11 is a diagram for explaining a sweep operation performed in the image capturing apparatus;

FIGS. 12A to 12C are diagrams for explaining the panoramic image capturing processing operation;

DESCRIPTION OF THE PREFERRED EMBODIMENTS

Figure 2A:
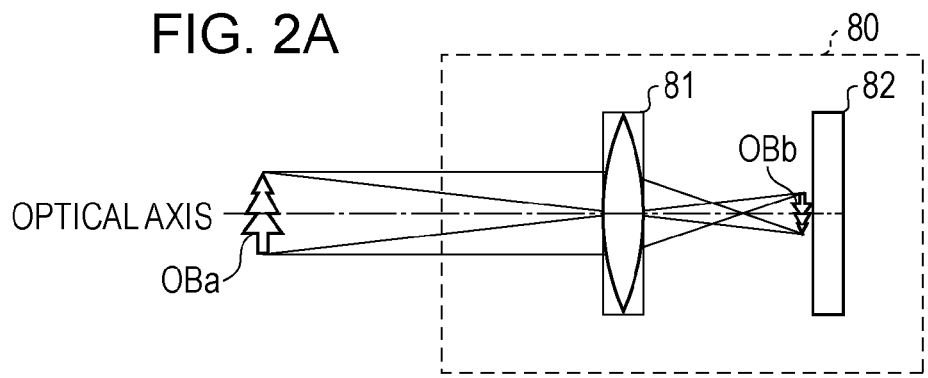
FIGS. 2A to 2D are diagrams for explaining a relationship between motions of an image capturing apparatus and a position of an optical image formed on an imaging surface of an imaging device.
Figure 2B:
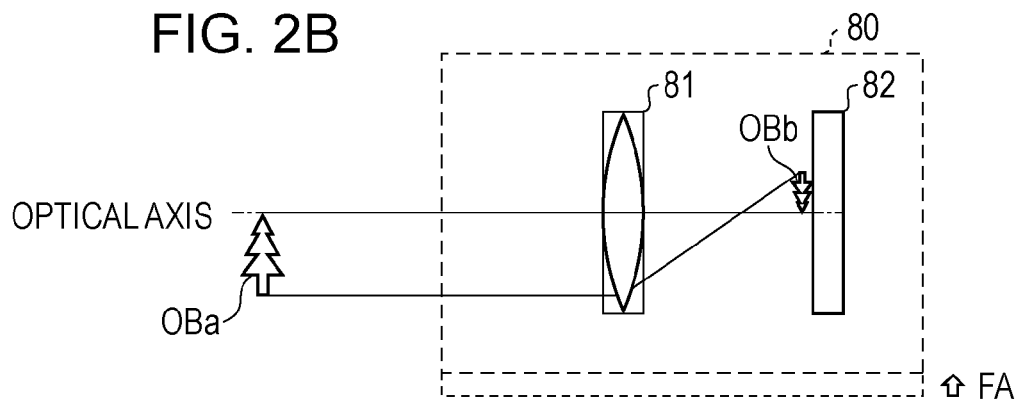

Hereinafter, preferred embodiments of the present invention will be described. In addition, the description will be performed in the following order.

1. First Embodiment
1-1. Configuration of Image Capturing Apparatus
1-2. External Appearance of Image Capturing Apparatus
1-3. Operation Performed in Image Capturing Apparatus
1-4. An Example of Generation Operation for Panoramic Captured Image 2. Second Embodiment
2-1. Configuration of Image Capturing Apparatus
2-2. Operation Performed in Image Capturing Apparatus 1. Configuration of First Embodiment 1-1. Configuration of Image Capturing Apparatus FIG. 1 is a block diagram illustrating the configuration of an image capturing apparatus according to an embodiment of the present invention. The image capturing apparatus 10 includes an imaging optical system block 11, a driver 12, an imaging optical system sensor unit 13, an imaging device 21, a timing signal generation (TG) unit 22, an analog front end (AFE) unit 23, a signal processing unit 24, and a detection unit 25. In addition, the image capturing apparatus 10 further includes an image output unit 31, a display unit 32, a recording/reproducing unit 33, an operation unit 41, a motion detection unit 42, and a control unit 50.

The imaging optical system block 11 includes a lens unit 11a and an aperture mechanism 11b used for adjusting the amount of light of an optical image formed on the imaging surface of the imaging device 21. The lens unit 11a includes, for example, a zoom lens 111 used for varying magnification, a focusing lens 112 used for performing focusing, a correction lens unit 113 used for moving the position of an optical image formed on the imaging surface of the below-described imaging device 21 on the imaging surface.

The correction lens unit 113 includes, for example, a correction lens provided so that an optical axis thereof coincides with an optical axis of the imaging optical system and an actuator used for moving the correction lens in a direction perpendicular to the optical axis of the imaging optical system. The correction lens unit 113 that has the above-described configuration displaces the correction lens from a position, at which the center thereof corresponds to the optical axis, in a plane perpendicular to the optical axis of the imaging optical system.

In addition, the correction lens unit 113 may use a variable vertex angle prism unit. The variable vertex prism unit is obtained by providing an incident end plate and a light-emitting end plate, which have translucency, on the end surface of a bendable cylinder such as a bellows or the like and enclosing a translucent liquid, which has a desired refractive index, in the cylinder. If the variable vertex angle prism unit is used, one of the incident end plate or the light-emitting end plate is fixed and the other thereof is driven by the actuator, thereby forming an optical wedge. The correction lens unit that has such a configuration displaces, for example, the inclined angle of the light-emitting end plate relative to the incident end plate and moves on the imaging surface the position of the optical image formed on the imaging surface.

Furthermore, the lens unit 11a may adopt any one of configurations in which an optical image is formed on an imaging surface, a lens unit is displaced in a plane perpendicular to an optical axis, and hence the position of the optical image formed on the imaging surface can be moved on the imaging surface. Accordingly, the configuration of the lens unit 11a is not limited to the configuration that includes the zoom lens 111, the focusing lens 112, and the correction lens unit 113.

On the basis of a lens control signal from the control unit 50 described later, the driver 12 drives the zoom lens 111 or the focusing lens 112 and the actuator of the correction lens unit 113. In addition, the driver 12 drives the aperture mechanism 11b on the basis of an aperture control signal from the control unit 50.

The imaging optical system sensor unit 13 detects the lens position of the zoom lens 111 or the focusing lens 112, the displacement state of the correction lens unit 113 (equal to the displacement position or the correction angle of the correction lens unit 113) and the setting position of the aperture mechanism 11b, and supplies a position signal to the control unit 50.

As the imaging device 21, for example, an imaging device such as a charge coupled device (CCD), a complementary metal oxide semiconductor (CMOS) image sensor or the like is used. The imaging device 21 converts an optical image formed on the imaging surface by the imaging optical system block 11 into an electric signal and outputs the electric signal to the AFE unit 23.

The TG unit 22 generates various types of driving pulses necessary for outputting the electric signal, which indicates the captured image, from the imaging device 21 and an electronic shutter pulse used for controlling a charge accumulation time of the imaging device 21.

With respect to the electric signal (image signal) output from the imaging device 21, the AFE unit 23 performs a noise eliminating processing operation such as a correlated double sampling (CDS) processing operation and an automatic gain control (AGC) processing operation for setting a captured-image signal to a desired signal level. Furthermore, the AFE unit 23 converts an analog captured-image signal, subjected to the noise eliminating processing operation and the gain control processing operation, into a digital signal and outputs the digital signal to the signal processing unit 24.

The signal processing unit 24 performs a camera signal preprocessing operation, a cameral signal processing operation, a resolution conversion processing operation, a compression/expansion processing operation, or the like. In the camera signal preprocessing operation, with respect to the image signal supplied from the AFE unit 23, a defect correction processing operation for correcting the signal of a defect pixel in the imaging device 21 and a shading correction processing operation for correcting dropping of the amount of peripheral light of the lens or the like are performed. In the camera signal processing operation, processing operations for adjusting white balance and correcting brightness or the like are performed. In a digital camera or the like, in some cases, red, green and blue signals are obtained using one imaging device in which a color filter array is provided on the front surface thereof. In this case, in the camera signal processing operation, a demosaic processing operation is performed, and missing color signals in the pixels are generated by interpolation or the like using the signals of the peripheral pixels. In the resolution conversion processing operation, the image signal subjected to the cameral signal processing operation or the expansion-decoded image signal is converted into a signal that has predetermined resolution. In the compression/expansion processing operation, the image signal after the camera signal processing operation or the image signal subjected to the resolution conversion processing operation is compression-encoded so as to form, for example, a JPEG-encoded signal. In the compression/expansion processing operation, the JPEG-encoded signal is expansion-decoded. In addition, in the compression/expansion processing operation, the image signal of a still image may be compression-encoded using a method different from the JPEG method. In addition, in the compression/expansion processing operation, the image signal of a moving image may be compression-encoded using a moving image compression method.

Furthermore, when a panoramic image is generated in the image capturing apparatus 10, the signal processing unit 24 calculates a motion vector using captured images, and synthesizes a plurality of captured images using the calculated motion vector so that images of the same subject overlap one another, thereby generating a panoramic image. In addition, the synthesis of captured images may be performed using a motion detection signal from the motion detection unit. In this case, even if a correct motion vector is not obtained, a plurality of captured images can be synthesized using the motion detection signal so that the images of the same subject overlap one another. In addition, it may be assumed that captured images used for generating a panoramic image are written in a memory, not illustrated, or are written in a recording medium by the recording/reproducing unit 33 described later. In addition, the generation of the panoramic image may be performed in an image capturing operation or in a reproducing operation. In addition, the generation of the panoramic image may be performed in an external apparatus different from the image capturing apparatus 10, for example, a computer or the like. When the generation of the panoramic image is performed in a reproducing operation or in an external apparatus, identification information, which enables the generation of the panoramic image performed in the reproducing operation or in the external apparatus, (for example, information that indicates a series of captured images, or information that indicates image capturing sequence) is provided for captured images used for generating a panoramic image. By providing the identification information in this way, captured images are synthesized in a correct order, thereby allowing a panoramic image to be generated.

The detection unit 25 detects the brightness level or the focusing state of a captured image using the captured-image signal supplied to the signal processing unit 24, and generates and supplies a detection signal, which indicates the brightness level or the focusing state, to the control unit 50.

The image output unit 31 converts the image signal processed by the signal processing unit 24 into an image signal with a format corresponding to an external device connected to the image capturing apparatus 10 and outputs the image signal.

The display unit 32 displays the image captured by the image capturing apparatus 10 or the captured image reproduced by the recording/reproducing unit 33. In addition, the display unit 32 performs a menu display for setting the imaging device 10 or the like.

In the recording/reproducing unit 33, for example, a recording medium such as a flash memory, an optical disk, or a magnetic tape is used. The recording/reproducing unit 33 records the image signal or the encoded signal of the captured image, output from the signal processing unit 24, on the recording medium. In addition, the recording/reproducing unit 33 performs a processing operation for reading and supplying the image signal recorded on the recording medium to the image output unit 31 or the display unit 32, or a processing operation for reading and supplying the encoded signal recorded on the recording medium to the signal processing unit 24. In addition, the recording/reproducing unit 33 is not limited to the configuration in which the recording medium can be attached or detached. For example, as the recording/reproducing unit 33, a hard disk device or the like may be embedded.

The operation unit 41 includes an operation button or a touch panel provided on the screen of the display unit 32. The operation unit 41 generates and supplies an operation signal corresponding to a user operation to the control unit 50.

The motion detection unit 42 detects motion that causes a shooting direction to change. For example, the motion detection unit 42 includes a gyro sensor and detects the motion applied to the image capturing apparatus 10. The motion detection unit 42 includes a yawing angular speed detection unit for detecting, for example, an angular speed in response to the shake of a yawing direction and a pitching angular speed detection unit for detecting, for example, an angular speed in response to the shake of a pitching direction. In addition, in the motion detection unit 42, a processing circuit for performing a signal processing operation for the detection signal is provided. In the processing circuit, for example, unnecessary signal components such as a noise component or a higher frequency component than a signal component of an angular speed value, a resonance frequency component and the like are eliminated from the detection signal. Furthermore, in the processing circuit, a processing operation for correcting drift generated owing to a temperature variation or a time variation, a processing operation for converting the detection signal into a digital signal and supplying the digital signal to the control unit 50 and the like are performed. If the detection signal is output as the analog signal from the motion detection unit 42, the control unit 50 may convert the motion detection signal into a digital signal and use the digital signal.

In addition, the motion detection unit 42 is not limited to the configuration in which the angular speed detection sensor is used. For example, motion may be detected using an acceleration detection sensor or the like. If the acceleration detection sensor is used, the output of the acceleration detection sensor may be integrated to calculate a speed. Furthermore, motion may be calculated by integrating the speed.

The control unit 50 includes a central processing unit (CPU) and a memory or the like. In the memory, a program executed by the CPU and a variety of data are stored. As the memory, for example, a non-volatile memory such as an electronically erasable and programmable ROM (EEPROM), a flash memory or the like is used. The CPU in the control unit 50 executes the program stored in the memory and, on the basis of the variety of data stored in the memory or the operation signal supplied from the operation unit 41, controls individual units so that the action of the image capturing apparatus 10 becomes the action corresponding to the user operation. For example, when the user performs a shutter operation, the control unit 50 controls the action of the TG unit 22 or the like and causes the recording/reproducing unit 33 to record an encoded signal or the like of a still image captured with a desired shutter speed on the recording medium therein. In addition, when a moving image recording starting operation is performed, an encoded signal of a moving image or the like is recorded on the recording medium in the recording/reproducing unit 33.

In addition, when the user performs a mode selection operation, the control unit 50 performs an image capturing operation in a mode selected by the user. For example, when one of a panoramic image capturing mode and a shake-corrected image capturing mode is selected by the user, the control unit 50 performs an image capturing operation in a mode selected by the user. In addition, the panoramic image capturing mode is a mode in which while an image capturing apparatus is swept, or moved in a parallel fashion, a plurality of captured images are generated that are to be synthesized at the time a panoramic image, the image capturing range of which is wider than that of one captured image, is generated. In the panoramic image capturing mode, a processing operation may be performed in which a plurality of captured images are synthesized to generate a panoramic image, or a processing operation may be performed in which a plurality of captured images generated are recorded in a recording medium or the like, and the synthesis of captured images is performed in an external apparatus. The shake-corrected image capturing mode is a mode in which a captured image with no image blurring due to a shake is generated by performing shake correction.

Furthermore, on the basis of the position signal supplied from the imaging optical system sensor unit 13 or the detection signal supplied from the detection unit 25, the control unit 50 generates and supplies a lens control signal and an aperture control signal to the driver 12. Accordingly, the focusing lens 112 and the aperture mechanism 11b are driven by the driver 12 so that a captured image, which is focused with a desired brightness, can be obtained. In addition, when the user performs a zoom operation, the control unit 50 generates and supplies the lens control signal to the driver 12 and hence drives the zoom lens 111 so that a captured image with a desired zoom ratio can be obtained.

In the image capturing apparatus 10 having such a configuration, the control unit 50 displaces at least one of the correction lens in the correction lens unit 113 and the imaging device 21 in response to the motion of the image capturing apparatus 10, detected by the motion detection unit 42. By displacing at least one of the correction lens and the imaging device, the control unit 50 corrects a shake so that an optical image, formed on the imaging surface of the imaging device 21, does not shake in response to the motion of the image capturing apparatus. Namely, the control unit 50 displaces at least one of the correction lens and the imaging device in response to the motion of the image capturing apparatus 10, thereby correcting the shake of a captured image, which occurs in response to the motion of the image capturing apparatus.

Figure 2C:
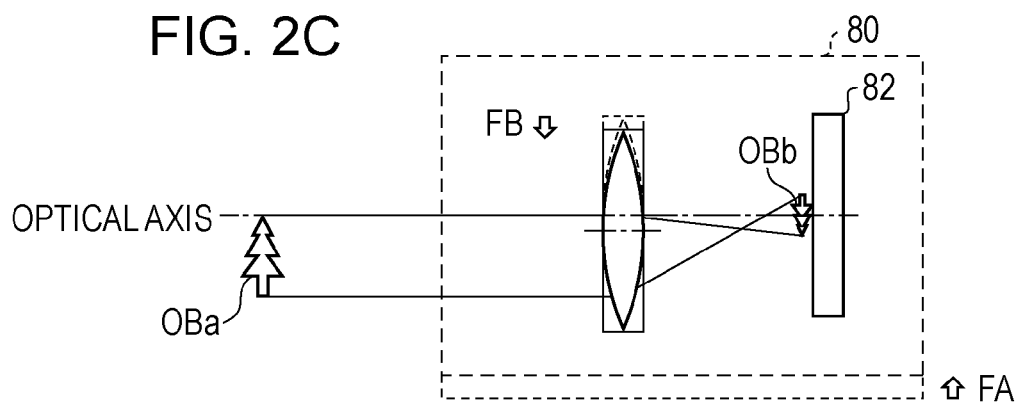
Figure 2D:
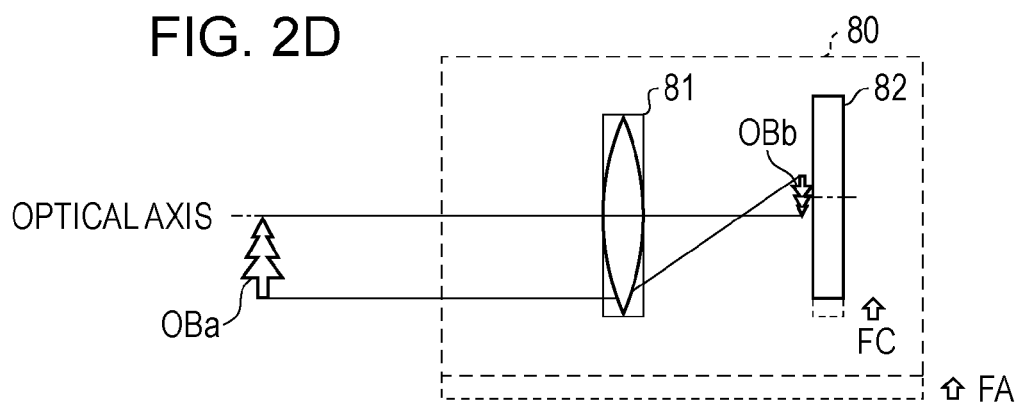

FIGS. 2A to 2D are diagrams for explaining a relationship between the motion of the image capturing apparatus and the position of the optical image formed on the imaging surface of the imaging device. For example, in FIG. 2A, the position of an image capturing apparatus 80 is set so that an optical image OBb of a subject Oba is located at the central position of the imaging surface of an imaging device. Next, when the motion of the image capturing apparatus 80 occurs and hence the image capturing apparatus 80 is moved in a direction indicated by an arrow FA illustrated in FIG. 2B, the position of the optical image OBb formed on the imaging surface is moved from the central position of the imaging surface. Here, as illustrated in FIG. 2C, when a lens unit 81 is moved in a direction, which is opposite to the motion direction of the image capturing apparatus 80 and is indicated by an arrow FB, the optical image OBb can be formed in the central position of the imaging surface. In addition, as illustrated in FIG. 2D, when the imaging device 82 is moved in a direction, which is the same direction as the motion direction of the image capturing apparatus 80 and is indicated by an arrow FC, the optical image OBb can be formed in the central position of the imaging surface. Namely, by displacing at least one of the lens unit 81 and the imaging device 82 in response to the motion of the image capturing apparatus 80, the shake of the captured image that occurs owing to the motion of the image capturing apparatus 80 can be corrected.

In addition, a displacement direction, in which the lens unit 81 or the imaging device 82 is displaced in response to the motion of the image capturing apparatus 80, may be any one of directions in which the movement of the optical image OBb, which occurs owing to the motion of the image capturing apparatus 80, is corrected. Therefore, the displacement direction is not limited to the directions illustrated in FIGS. 2C and 2D.

For example, when the control unit 50, illustrated in FIG. 1, causes the lens unit to be displaced, the control unit 50 generates, on the basis of the detection signal from the motion detection unit 42, the lens control signal used for displacing the correction lens in the correction lens unit 113 so that the shake of a captured image does not occur, and outputs the lens control signal to the driver 12. On the basis of the lens control signal, the driver 12 generates and outputs a drive signal to the correction lens unit 113. On the basis of the drive signal, the correction lens unit 113 displaces the correction lens using the actuator. In this way, by driving the correction lens unit 113 on the basis of the motion detection signal from the motion detection unit 42, the correction lens in the correction lens unit 113 is displaced with respect to the optical axis, thereby performing the shake correction.

In addition, when the shake correction is performed by displacing the imaging device 21, an actuator 21a is provided in the image capturing apparatus 10 as illustrated by a dotted line in FIG. 1, the actuator 21a being used for moving the imaging device 21 in a direction perpendicular to the optical axis. Furthermore, on the basis of the detection signal from the motion detection unit 42, the control unit 50 generates a position control signal used for displacing the imaging device 21 so that the shake of a captured image does not occur, and outputs the position control signal to the driver 12. On the basis of the position control signal, the driver 12 generates and outputs a drive signal to the actuator 21a. On the basis of the drive signal, the actuator 21a displaces the imaging device 21. In this way, by driving the actuator 21a on the basis of the motion detection signal from the motion detection unit 42, the imaging device 21 is displaced with respect to the optical axis, thereby correcting the shake of the optical image formed on the imaging surface of the imaging device.

Furthermore, when, with a shooting direction being moved, each of a plurality of captured images is generated so that a panoramic image is generated from the plurality of captured images, the control unit 50 displaces correction operation start positions of the lens unit and/or the imaging device which are to be displaced, from positions, at which the centers thereof correspond to the optical axis, in a direction based on a direction in which the shooting direction is moved. Accordingly, a shake correctable range in which shake correction is performed for the movement of the shooting direction is enlarged, compared with a case in which the correction operation start positions are set to the positions at which the centers correspond to the optical axis.

In a case in which the control unit 50 drives the correction lens and/or the imaging device from the correction operation start positions in response to the motion of the image capturing apparatus, when the correction lens and/or the imaging device can be moved so as to keep pace with the motion of the image capturing apparatus, the control unit 50 regards positions at the start of an correction operation as positions at the start of exposure and starts an exposure operation. In addition, when, at the start of driving, the movements of the correction lens and/or the imaging device are delayed with respect to the motion of the image capturing apparatus, the control unit 50 starts the exposure operation after the movements of the correction lens and/or the imaging device have followed the motion of the image capturing apparatus. In addition, a time period necessary for reaching a state in which the movements of the correction lens and/or the imaging device follow the motion of the image capturing apparatus is short. Accordingly, the positions at the start of exposure are located near the correction operation start positions, and are located at positions to which the correction lens and/or the imaging device are displaced from positions, at which the centers thereof correspond to the optical axis, in a direction based on a direction in which the shooting direction is moved.

During an exposure time period, the control unit 50 puts a shake correction operation into an operating state, the shake correction operation being an operation in which, by causing the correction lens and/or the imaging device to move in response to the motion of the image capturing apparatus, a shake due to the motion of the image capturing apparatus is corrected, and generates a captured image in which image blurring due to the motion of the image capturing apparatus does not occur.

In addition, in a case in which at least one of the lens unit and the imaging device is displaced with respect to the optical axis, when an captured image is in a state in which the displacement thereof is large, the quality of the captured image turns out to be degraded with respect to distortion, chromatic aberration, and resolution. Accordingly, the control unit 50 sets the correction operation start position (exposure start position) in response to the length of an exposure time period so that the displacement during the exposure time period becomes small. Namely, when the exposure time period is short, a displacement amount from a position, at which the center of one of the lens unit and the imaging device corresponds to the optical axis, is reduced and the correction operation start position (exposure start position) is set so that the captured image is generated in a state in which the displacement is small. In addition, when the displacement amount of the correction operation start position is reduced, the correctable range of shake correction turns out to be narrow. Therefore, when the exposure time period is long, the lens unit and the imaging device may not be displaced to match the motion of the image capturing apparatus. Accordingly, when the exposure time period is long, the control unit 50 increases a displacement amount from a position, at which the center of one of the lens unit and the imaging device corresponds to the optical axis, and sets the correction operation start position, thereby enlarging the correctable range of shake correction.

In addition, in the following description, a case in which, by displacing the correction lens, a shake correction operation is performed for the motion of the image capturing apparatus will be described. In addition, it may be assumed that the correction operation start position is equal to the exposure start position.

1-2. External Appearance of Image Capturing Apparatus

Figure 3:
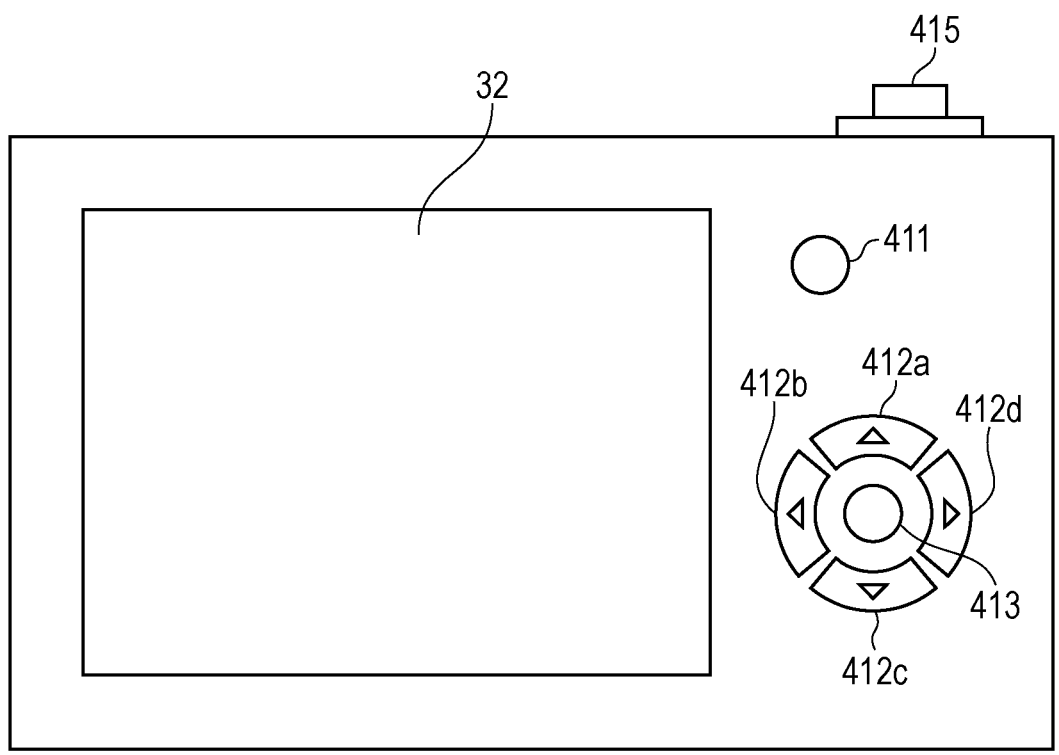
FIG. 3 is a diagram illustrating an external appearance of the image capturing apparatus.

FIG. 3 illustrates an external appearance of the image capturing apparatus 10. A display unit 32 is provided on the rear face of the chassis of the image capturing apparatus 10, and an operation unit 41 is provided near the display unit 32. The operation unit 41 includes a plurality of operation keys. For example, a menu key 411 is an operation key used for displaying a menu on the display unit 32. Direction keys 412a to 412d are operation keys operated when the selection of menu items or the like is performed. A decision key 413 provided in the central portion of the direction keys 412a to 412d is an operation key operated when a decision operation for a selected item or the like is performed. Furthermore, a shutter key 415 provided on the upper surface of the chassis is an operation key used for performing a shutter operation. In addition, the operation unit 411 illustrated in FIG. 3 is just an example, and the positions and kinds of keys are not limited to the example. In addition, a touch panel may be provided on the screen of the display unit 32, and, by touching a predetermined position, the setting of various kinds of operations, the instruction of executions, or the like may be performed.

1-3. Operation Performed in Image Capturing Apparatus

Figure 4:
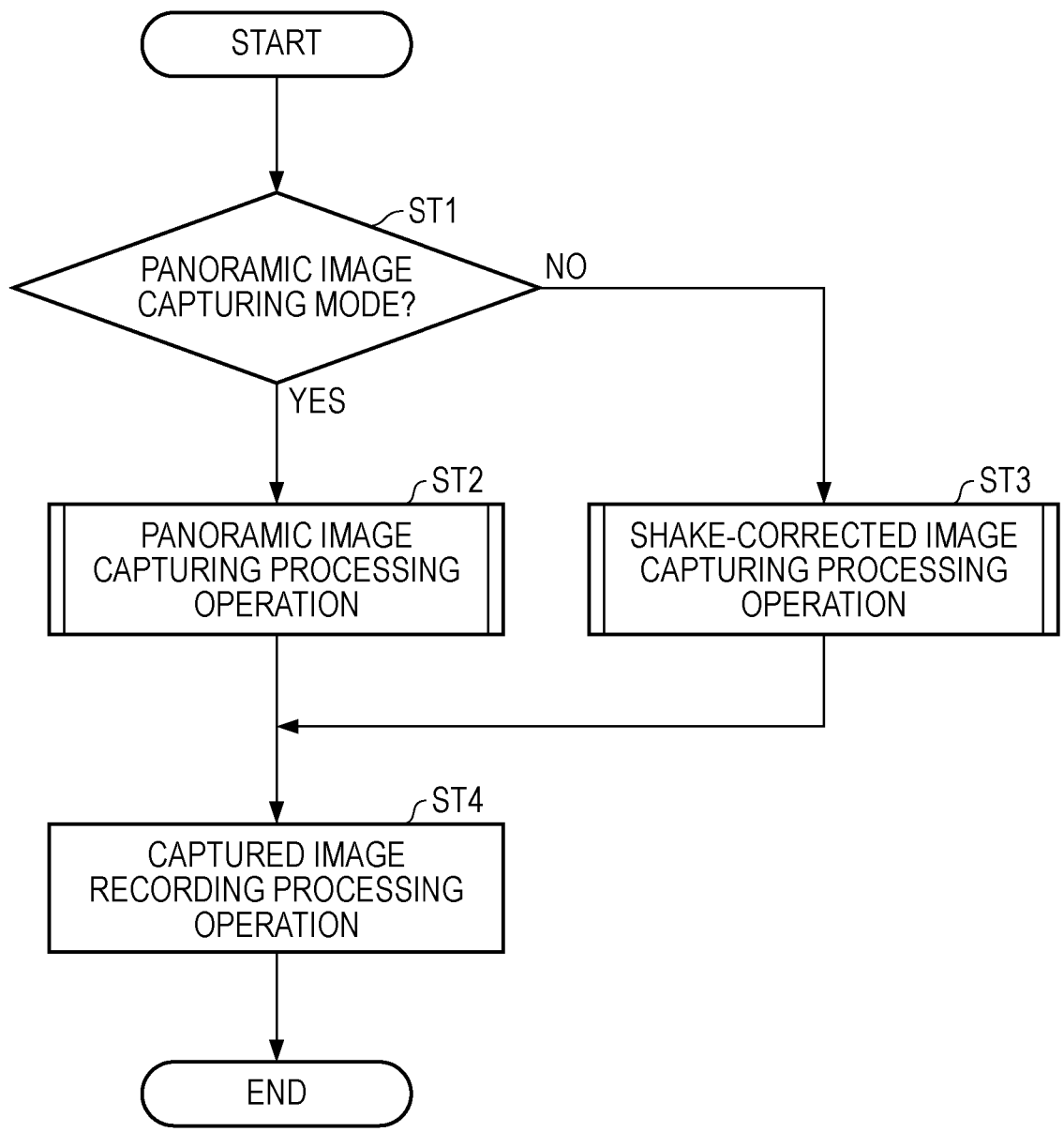
FIG. 4 is a flowchart illustrating an operation performed in the first embodiment.

FIG. 4 is a flowchart illustrating an operation performed in the first embodiment. In addition, FIG. 4 illustrates a case in which the image capturing apparatus 10 has an image capturing mode (hereinafter, called "panoramic image capturing mode") in which, with a shooting direction being moved, a plurality of captured images are generated so that a panoramic image is generated from the plurality of captured images, and another image capturing mode (hereinafter, called "shake-corrected image capturing mode") different from the panoramic image capturing mode. In addition, for example, the image capturing mode different from the panoramic image capturing mode corresponds to an image capturing mode in which one captured image is generated or an image capturing mode in which when an image capturing operation is performed at night or the like, a plurality of captured images that have different exposure amounts are superposed on one another with the ratio of one of the plurality of captured images being increased in units of regions so that a captured image in which a person and a background have individual desired brightness is obtained.

Figure 5:
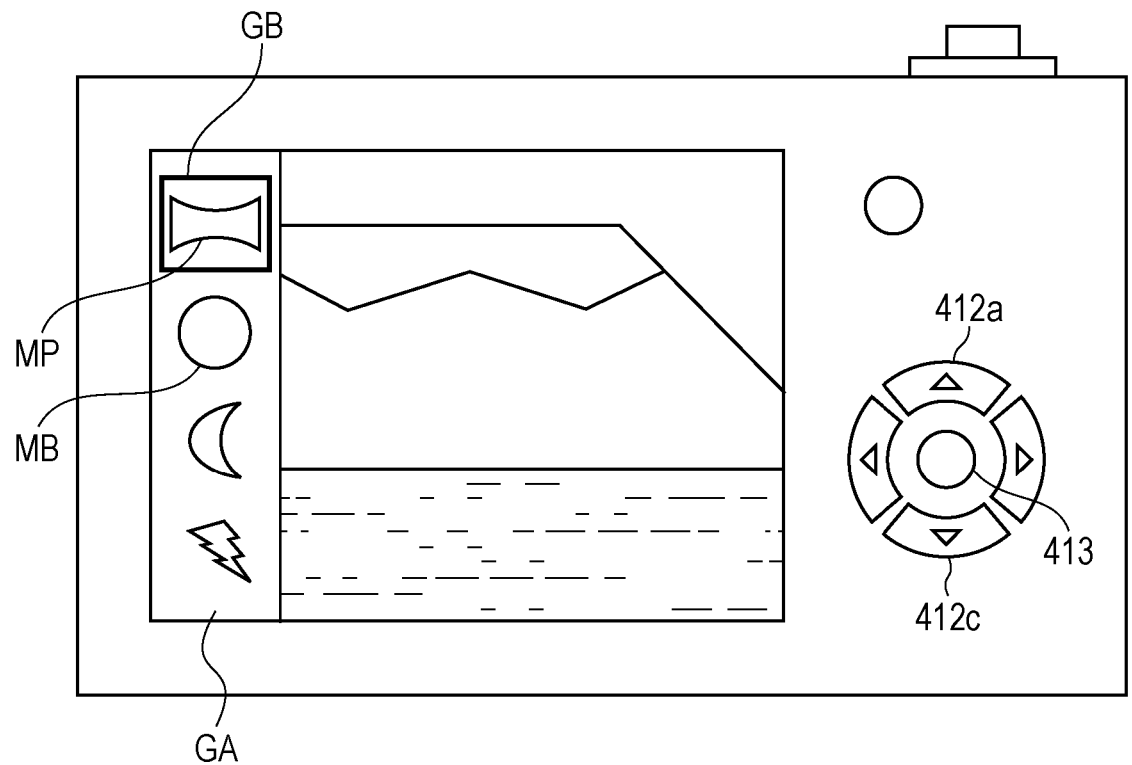
FIG. 5 is a diagram illustrating a state in which a menu display is performed.

In Step ST1, the control unit 50 determines whether or not the image capturing mode is the panoramic image capturing mode. When it is determined that the menu key 411 in the operation unit 41 is operated, the control unit 50 performs a menu display GA on the display unit 32. FIG. 5 illustrates a state in which the display unit 32 performs the menu display. After that, the control unit 50 switches a mode in response to the operation of the direction key 412a indicating an upward direction or the direction key 412c indicating a downward direction, and displays a selected mode in an identifiable manner. For example, the control unit 50 provides a cursor display GB illustrated in FIG. 5, and moves the position of the cursor display GB up and down in response to the operations of the direction keys 412a and 412c, thereby causing the selected image capturing mode to be identifiable. Furthermore, the control unit 50 sets an image capturing mode, which is selected when the decision key 413 is operated, to an image capturing mode in the image capturing apparatus 10. Here, when a panoramic image capturing mode MP is selected as the image capturing mode, the control unit 50 proceeds to Step ST2. On the other hand, when a shake-corrected image capturing mode MB is selected as the image capturing mode, the control unit 50 proceeds to Step ST3.

The control unit 50 performs a panoramic image capturing processing operation in Step ST2, and proceeds to Step ST4.

When proceeding from Step ST1 to Step ST3, the control unit 50 performs a shake-corrected image capturing processing operation, and proceeds to Step ST4.

In Step ST4, the control unit 50 causes the recording/reproducing unit 33 to record a panoramic captured image generated in Step ST2 or a shake-corrected captured image generated in Step ST3 in a recording medium.

Figure 6:
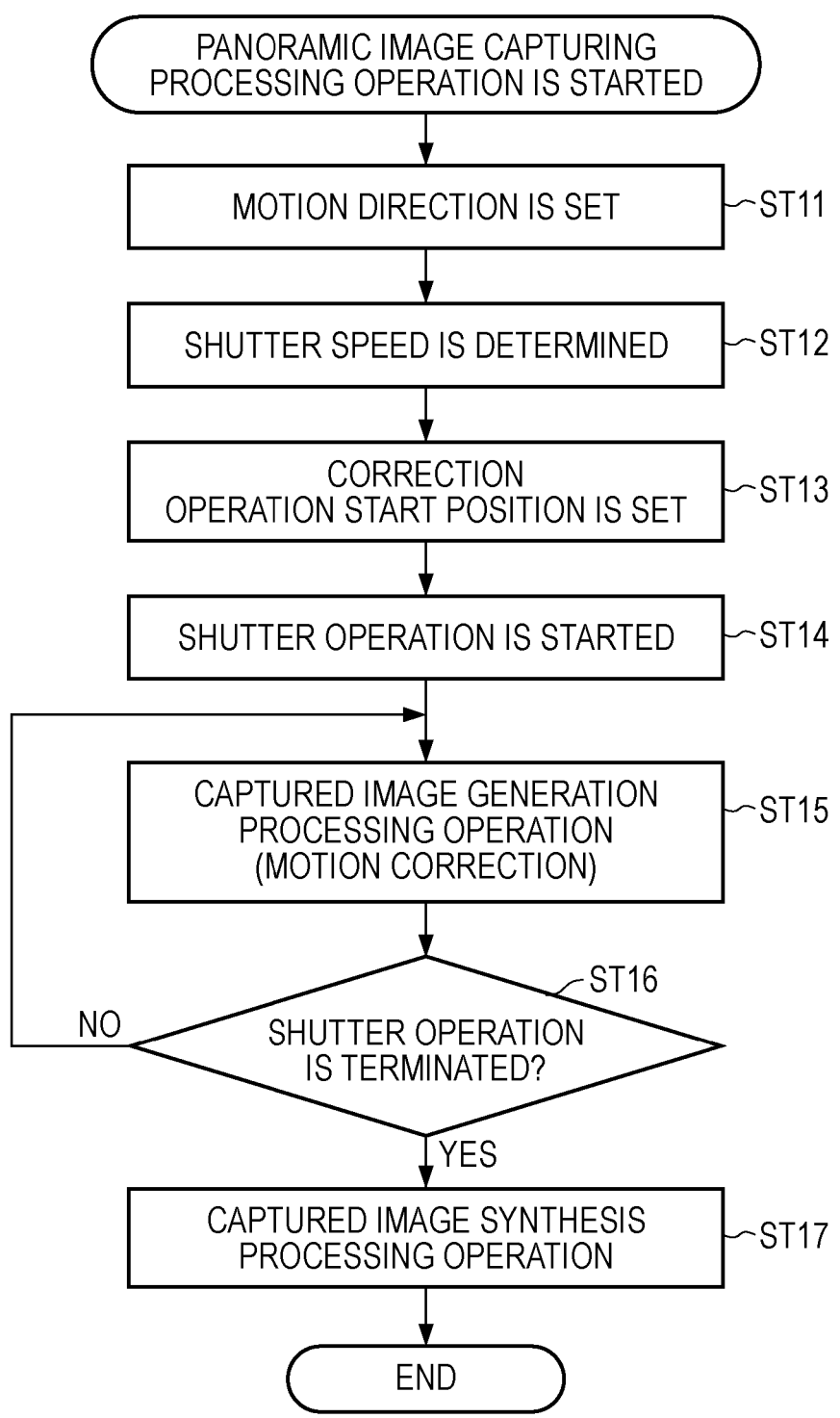
FIG. 6 is a flowchart illustrating a panoramic image capturing processing operation.

Next, the panoramic image capturing processing operation will be described. FIG. 6 is a flowchart illustrating the panoramic image capturing processing operation. In Step ST11, the control unit 50 sets the motion direction of the image capturing apparatus. The control unit 50 displays a direction selection menu on the display unit 32, the direction selection menu being used for selecting a direction in which the image capturing apparatus is swept, or moved in a parallel fashion, so as to generate a panoramic image. The control unit 50 determines which direction a user selects, on the basis of an operation signal from the operation unit 41, sets the determined direction to the motion direction of the image capturing apparatus, and proceeds to Step ST12.

In Step ST12, the control unit 50 determines a shutter speed. The control unit 50 determines the shutter speed set by the user or the shutter speed preliminarily set, and proceeds to Step ST13.

In Step ST13, the control unit 50 sets a correction operation start position. The control unit 50 displaces a correction lens 113a in the correction lens unit 113 in a direction based on a direction in which a shooting direction is moved, and hence sets the correction operation start position. Namely, by displacing the correction lens 113a and hence setting the correction operation start position, the control unit 50 enlarges a shake correctable range that ranges from a movement start position, from which the correction lens 113a is to be moved in response to the motion of the image capturing apparatus, to a maximum movable position. For example, in a case in which, by moving the correction lens 113a in the correction lens unit 113 in a left direction, a shake is corrected when the shooting direction moved in a right direction, the correction lens 113a in the correction lens unit 113 is displaced from the center position in the right direction using an actuator 113b, as illustrated in FIG. 7. In addition, in FIG. 7, a position indicated by a dotted line AR indicates the position of a correction control end in the correction lens 113a. In addition, a circle indicated by a dashed-dotted line indicates a state in which the correction lens 113a is located at a central position at which the center of the correction lens 113a corresponds to the optical axis. Here, when the correction lens 113a is located at the central position, a captured image turns out to be an image that has a least degraded image quality with respect to distortion, chromatic aberration, and resolution.

The control unit 50 sets a displacement amount in response to an exposure time period, namely, a shutter speed so that a captured image which has a less degraded image quality with respect to distortion, chromatic aberration, and resolution can be obtained. In addition, when an electronic shutter operation is performed in the imaging device, a non-exposure time period occurs. When the shutter speed is fast (the exposure time period is short), the motion of the image capturing apparatus during the exposure time period is small, compared with a case in which the shutter speed is slow (the exposure time period is long). Namely, the displacement amount of the correction lens 113a during the exposure time period is small. Therefore, in a case in which the shutter speed is fast, when the correction lens 113a has been displaced to the position of the correction control end, in some cases, the exposure time period has been terminated before the correction lens 113a reaches the central position, and hence a captured image turns out to be an image that has a degraded image quality with respect to distortion, chromatic aberration, and resolution. Consequently, when the shutter speed is slow, the control unit 50 increases the amount of displacement from the center position (a position at which the center of the correction lens 113a corresponds to the optical axis) as illustrated in FIG. 7A, and sets a position, which is distantly located from the center position, to the correction operation start position. In addition, when the shutter speed is fast, the control unit 50 decreases the amount of displacement as illustrated in FIG. 7B, and sets a position, which is located close to the center position, to the correction operation start position.

Figure 8:
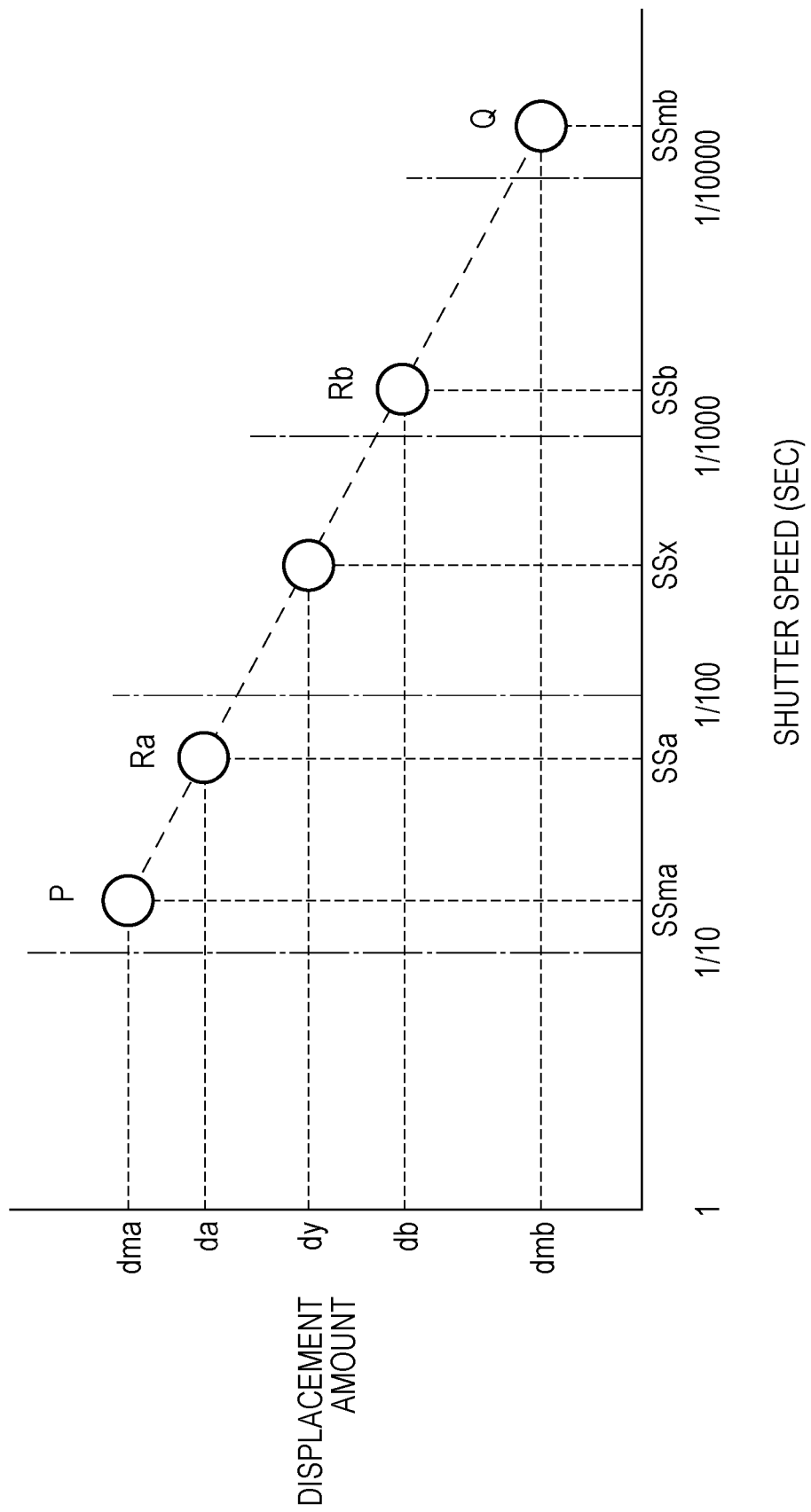
FIG. 8 is a diagram illustrating a relationship between a shutter speed and an offset amount.

FIG. 8 illustrates a relationship between a shutter speed and a displacement amount. In a case in which the shutter speed is slow, for example, the shutter speed is an "SSma", since the exposure time period is long, the displacement amount is set to a "dma" that is a distance from the center position to the correction control end. In addition, in a case in which the shutter speed is fast, for example, the shutter speed is an "SSmb", since the exposure time period is short, the displacement amount is set to a "dmb" that is less than the "dma". In addition, considering the condition or the like of a shake correction operation performed in various kinds of image capturing conditions when the exposure time period is short, the displacement amount "dmb" is preliminarily stored by the image capturing apparatus 10.

When the shutter speed is in a range from the "SSma" to the "SSmb", a displacement amount "dy" according to the shutter speed "SSx" (SSma>SSx>SSmb) is calculated on the basis of an expression (1). For example, when the shutter speed is "SSa", the displacement amount turns out to be "da", and when the shutter speed is "SSb", the displacement amount turns out to be "db".

[Expression 1]

$$dy = \frac{dma - dmb}{SSma - SSmb}(SSx - SSmb) + dmb \quad (1)$$

In this way, the control unit 50 calculates the displacement amount in response to the shutter speed, moves the correction lens 113*a* by the displacement amount in a direction in which the correctable range of shake correction is enlarged with respect to the motion of the image capturing apparatus, and proceeds to Step ST14 illustrated in FIG. 6. In addition, a configuration may be adopted in which the displacement amount is preliminarily calculated and stored in a memory or the like, and the control unit 50 reads out the displacement amount from the memory or the like in response to the shutter speed.

In Step ST14, the control unit 50 starts a shutter operation and proceeds to Step ST15. The start of shutter operation is performed on the basis of the operation of the shutter key 415 or the motion detection signal. For example, when the control unit 50 detects a state in which the shutter key 415 has been pressed down, the control unit 50 starts the shutter operation.

In addition, if the motion detection signal is used, the shutter operation can be automatically started. For example, when, on the basis of the motion detection signal, the control unit 50 detects that the image capturing apparatus has been swept, or moved in a parallel fashion, in a direction determined in Step ST11, the control unit 50 starts the shutter operation. In this way, if, without operating the shutter key 415, the user simply moves the direction of the image capturing apparatus 10 in a direction indicated by the image capturing apparatus 10, the shutter operation can be started. In a case in which the shutter operation is started when a state in which the shutter key 415 has been pressed down is detected, when the operation of the shutter key 415 causes a shake to occur, the effect of the shake may appear in a panoramic image. However, if the shutter operation is started using the motion detection signal, it is not necessary to operate the shutter key 415, and hence the panoramic image in which no effect of image blurring due to the shutter operation appears can be easily obtained.

In addition, when the shutter operation is performed, by displaying an direction indicator on the screen of the display unit 32, which indicates the motion direction of the image capturing apparatus, the image capturing apparatus 10 can be correctly swept, or moved in a parallel fashion, in a set direction.

In Step ST15, the control unit 50 performs a captured image generation processing operation. The control unit 50 drives the correction lens 113*a*, which is located at the correction operation start position, in response to the motion detection signal, and hence corrects the shake of an optical image, which occurs owing to the motion of the image capturing apparatus. When, at the start of a correction operation, the correction lens 113*a* can be moved so as to keep pace with the motion of the image capturing apparatus, the control unit 50 starts an exposure operation from the correction operation start position that is regarded as a position at the start of exposure. In addition, when, at the start of the correction operation, the movement of the correction lens 113*a* is delayed with respect to the motion of the image capturing apparatus, the control unit 50 starts the exposure operation from a position at which the correction lens 113*a* is put into a state in which the movement of the correction lens 113*a* follows the motion of the image capturing apparatus and that is regarded as a position at the start of exposure. In addition, the position at the start of exposure is located near the correction operation start position, and is located at a position to which the correction lens 113*a* is displaced from a position, at which the center thereof corresponds to the optical axis, in a direction based on a direction in which the shooting direction is moved. Furthermore, during the exposure time period, the control unit 50 puts the shake correction operation into an operating state. Therefore, even if the image capturing apparatus 10 is swept, or moved in a parallel fashion, the control unit 50 causes a captured image, in which image blurring due to the motion of the image capturing apparatus 10 does not occur, to be generated, and proceeds to Step ST16. In addition, in the captured image generation processing operation, the control unit 50 displaces the correction operation start position in a direction based on a direction in which the shooting direction is moved, and hence enlarges a correctable range of a shake correction. Accordingly, a position at the start of exposure is displaced in accordance with the displacement of the correction operation start position, and thereby a time period in which the shake correction can be performed in response to the motion of the image capturing apparatus 10 can be lengthened, compared with a case in which the position of the lens unit 113*a* at the start of exposure is a position at which the center thereof corresponds to the optical axis. Namely, since the time period in which the shake correction can be performed in response to the motion of the image capturing apparatus 10 can be lengthened, a captured image in which image blurring due to the motion of the image capturing apparatus 10 does not occur can be generated even if it is necessary to lengthen an exposure time period owing to the insufficient light amount of a subject.

Furthermore, the control unit 50 sets the displacement amount in response to the shutter speed, and determines the correction operation start position. Namely, the position of the lens unit 113*a* at the start of exposure is displaced in accordance with the displacement of the correction operation start position, and the position at the start of exposure is displaced by a displacement amount, which corresponds to the shutter speed, from a position at which the center of the lens unit 113*a* corresponds to the optical axis. Therefore, a captured image that has a less degraded image quality with respect to distortion, chromatic aberration, and resolution is generated. For example, when the shutter speed is fast, the position of the lens unit 113*a* during the exposure time period is located near the center position. Accordingly, a captured image that has a less degraded image quality with respect to distortion, chromatic aberration, and resolution can be generated.

In Step ST16, the control unit 50 determines whether or not the shutter operation has been terminated. When it is determined that the shutter operation has not been terminated yet, the control unit 50 returns the position of the correction lens 113*a* to the correction operation start position, and returns to Step ST15. When returning from Step ST16 to Step ST15, the control unit 50 returns the position of the correction lens 113*a* to the correction operation start position during a period between the exposure time period for the captured image and an exposure time period for a subsequent image to be captured. After that, the control unit 50 drives again the correction lens 113*a* in response to the motion detection signal, and generates an image in which no image blurring occurs even if the image capturing apparatus 10 is swept, or moved in a parallel fashion.

In addition, when it is determined that the shutter operation has been terminated, the control unit 50 proceeds to Step ST17. For example, when the motion amount (a sweep amount or a movement amount) of the image capturing apparatus has reached a predetermined amount preliminarily set, the control unit 50 terminates the shutter operation. The motion amount can be calculated using, for example, a motion vector. In addition, the control unit 50 may determine the motion amount of the image capturing apparatus on the basis of the motion detection signal, and terminate the shutter operation when the motion amount has reached the predetermined amount. In addition, in a case in which the control unit 50 detected a state in which the shutter key 415 had been pressed down, and started the shutter operation, when the control unit 50 detects that the shutter key 415 has been put into a state in which the shutter key 415 has not been pressed down, the control unit 50 may terminate the shutter operation. Furthermore, in a case in which, on the basis of the motion detection signal, the control unit 50 detected that the direction of the capturing apparatus 10 had moved in an informed moving direction, and started the shutter operation, when the direction of the capturing apparatus 10 has stopped moving in the informed moving direction, the control unit 50 may also terminate the shutter operation.

In Step ST17, the control unit 50 performs a captured image synthesis processing operation. By controlling the signal processing unit 24, the control unit 50 calculates the motion vector using a plurality of captured images generated in the processing operations performed in Step ST15 and Step ST16. In addition, on the basis of the calculated motion vector, the control unit 50 synthesizes the plurality of captured images so that the images of the same subject overlap one another, and hence generates a panoramic image, the image capturing range of which is wider than that of one captured image, from the plurality of captured images. After that, the control unit 50 terminates the panoramic captured image synthesis processing operation.

Figure 9:
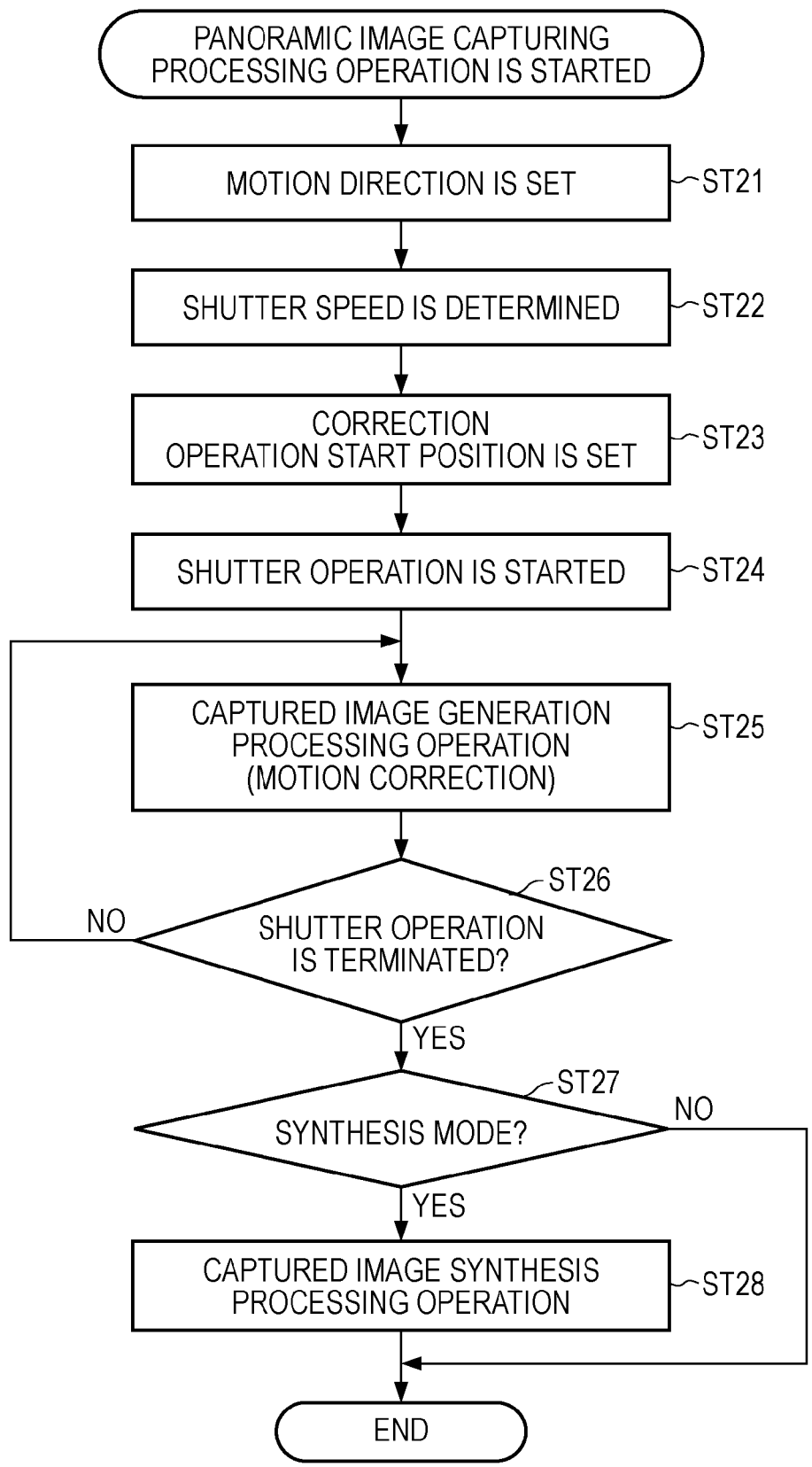
FIG. 9 is a flowchart illustrating another example of the panoramic image capturing processing operation.

Next, another example of the panoramic image capturing processing operation will be described. In the other example, a case is illustrated in which it can be selected whether a panoramic image is generated by synthesizing a plurality of captured images or a panoramic image is generated in an external apparatus using the plurality of captured images recorded in a recording medium or the like. FIG. 9 is a flowchart illustrating the other example of the panoramic image capturing processing operation. In Step ST21, the control unit 50 sets the motion direction of the image capturing apparatus. The control unit 50 displays a direction selection menu on the display unit 32, the direction selection menu being used for selecting a direction in which the image capturing apparatus is swept, or moved in a parallel fashion, so as to generate a panoramic captured image. The control unit 50 determines which direction a user selects, on the basis of an operation signal from the operation unit 41, sets the determined direction to the motion direction of the image capturing apparatus, and proceeds to Step ST22.

In Step ST22, the control unit determines a shutter speed. The control unit 50 determines the shutter speed set by a user operation or the shutter speed preliminarily set, and proceeds to Step ST23.

In Step ST23, the control unit 50 sets a correction operation start position. The control unit 50 displaces the correction lens 113*a* in the correction lens unit 113 in a direction based on a direction in which a shooting direction is moved, and hence sets the correction operation start position. Namely, by displacing the correction lens 113*a* and hence setting the correction operation start position, the control unit 50 enlarges a shake correctable range that ranges from a movement start position, from which the correction lens 113*a* is to be moved in response to the motion of the image capturing apparatus, to a maximum movable position. In addition, the control unit 50 sets a displacement amount in response to an exposure time period, namely, a shutter speed so that a captured image which has a less degraded image quality with respect to distortion, chromatic aberration, and resolution can be obtained. In this way, the control unit 50 moves the correction lens 113*a* by the displacement amount, which corresponds to the shutter speed, in a direction in which the correction range of shake correction is enlarged with respect to the sweep direction, and proceeds to Step ST24.

In Step ST24, the control unit 50 determines whether or not a mode is a synthesis mode. When a non-synthesis mode is selected in which a processing operation in which a panoramic image is generated by synthesizing a plurality of captured images is not performed in the panoramic image capturing processing operation, the control unit 50 proceeds to Step ST25. In addition, when the synthesis mode is selected in which a panoramic image is generated by synthesizing a plurality of captured images, the control unit 50 proceeds to Step ST28.

In Step ST24, the control unit 50 starts a shutter operation and proceeds to Step ST25. For example, when the control unit 50 detects a state in which the shutter key 415 has been pressed down, the control unit 50 starts the shutter operation.

In addition, when the shutter operation is performed, by displaying an direction indicator on the screen of the display unit 32, which indicates the motion direction of the image capturing apparatus, the motion direction of the image capturing apparatus can be set to a set direction.

In Step ST25, the control unit 50 performs the captured image generation processing operation. The control unit 50 drives the correction lens 113*a*, which is located at the correction operation start position, in response to the motion detection signal, and hence performs a correction operation (motion correction) for a shake that occurs owing to the sweep operation. Namely, the control unit 50 generates a captured image, in which image blurring due to the motion of the image capturing apparatus 10 does not occur, and proceeds to Step ST26. Here, the correction operation start position is displaced in a direction based on the motion direction of the image capturing apparatus, and a shake correctable range is enlarged. Accordingly, when the image capturing apparatus 10 is swept, or moved in a parallel fashion, a shake correctable time period is lengthened, compared with a case in which the correction operation start position is not displaced. Therefore, the exposure time can be lengthened. In addition, since the correction operation start position is displaced in response to the shutter speed, a captured image that has a less degraded image quality with respect to distortion, chromatic aberration, and resolution is generated. For example, when the shutter speed is fast, the position of the lens unit 113a during the exposure time period is located near the center position. Accordingly, a captured image that has a less degraded image quality with respect to distortion, chromatic aberration, and resolution can be generated.

In Step ST26, the control unit 50 determines whether or not the shutter operation has been terminated. When it is determined that the shutter operation has not been terminated yet, the control unit 50 returns to Step ST25. When returning from Step ST26 to Step ST25, the control unit 50 returns the position of the correction lens 113a to the correction operation start position during a period between the exposure time period for the captured image and an exposure time period for a subsequent image to be captured. After that, the control unit 50 drives again the correction lens 113a in response to the motion detection signal, and generates an image in which no image blurring occurs even if the image capturing apparatus 10 is swept, or moved in a parallel fashion. In addition, when it is determined that the shutter operation has been terminated, the control unit 50 proceeds to Step ST27.

In Step ST27, the control unit 50 determines whether or not the synthesis mode is selected. When the synthesis mode is selected, the control unit 50 proceeds to Step ST28, and when the synthesis mode is not selected, the control unit 50 terminates the panoramic image capturing processing operation.

In Step ST28, the control unit 50 performs a captured image synthesis processing operation. By controlling the signal processing unit 24, the control unit 50 calculates the motion vector using a plurality of captured images generated in the processing operations performed in Step ST25 and Step ST26. In addition, on the basis of the calculated motion vector, the control unit 50 synthesizes the plurality of captured images so that the images of the same subject overlap one another, and hence generates a panoramic image, the image capturing range of which is wider than that of one captured image, from the plurality of captured images. After that, the control unit 50 terminates the panoramic image capturing processing operation.

In this way, in a case in which the synthesis of a plurality of captured images is performed in a device, for example a computer, different from the image capturing apparatus, when the non-synthesis mode is selected, a pre-synthesis captured image can be recorded in a recording medium using the recording/reproducing unit 33. In addition, the pre-synthesis captured image may be transmitted to a computer device through a wire communication path or a wireless communication path.

Figure 10:
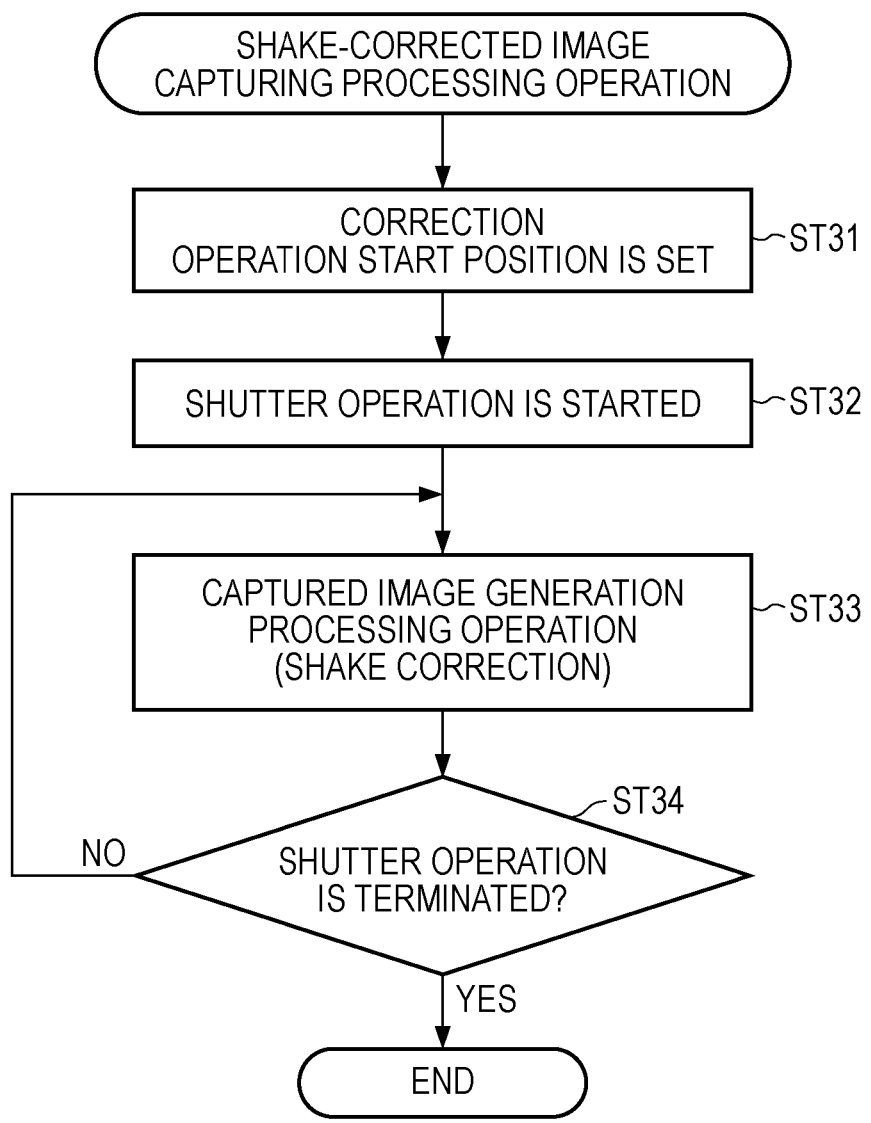
FIG. 10 is a flowchart illustrating a shake-corrected image capturing processing operation.

Next, a shake-corrected image capturing processing operation will be described. FIG. 10 is a flowchart illustrating a shake-corrected captured image generation processing operation. In Step ST31, the control unit 50 sets the correction operation start position. In the generation of a shake-corrected captured image, it is not necessary to displace the correction operation start position so that a correctable range in which shake correction for the motion of the image capturing apparatus is performed is enlarged. Namely, regarding the correction lens 113a, the control unit 50 sets the central position, at which a captured image that has a least degraded image quality with respect to distortion, chromatic aberration, and resolution is generated, to the correction operation start position.

In Step ST32, the control unit 50 starts a shutter operation and proceeds to Step ST33. For example, when the control unit 50 detects a state in which the shutter key 415 has been pressed down, the control unit 50 starts the shutter operation.

In Step ST33, the control unit 50 performs a captured image generation processing operation. The control unit 50 drives the correction lens 113a, which is located at the correction operation start position, in response to the motion detection signal, and hence performs a correction operation (shake correction) for a shake that occurs during an image capturing operation. In addition, the control unit 50 causes a captured image in which no image blurring due to a shake occurs to be generated, and proceeds to Step ST34.

In Step ST34, the control unit 50 determines whether or not the shutter operation has been terminated. When it is determined that the shutter operation has not been terminated yet, the control unit 50 returns to Step ST33. When returning from Step ST34 to Step ST33, the control unit 50 drives again the correction lens 113a in response to the motion detection signal, and generates an image in which no image blurring due to a shake occurs.

In addition, when it is determined that the shutter operation has been terminated, the control unit 50 terminates the shake-corrected image capturing processing operation. When the control unit 50 detects that the shutter key 415 has been put into a state in which the shutter key 415 has not been pressed down, the control unit 50 terminates the shutter operation. The control unit 50 repeatedly performs the captured image generation processing operation until the termination of the shutter operation, and generates a plurality of images to terminate the shake-corrected image capturing processing operation.

In this way, in the panoramic image capturing mode, the control unit 50 displaces at least one of the lens unit and the imaging device in a direction based on a direction in which the shooting direction is moved, and hence sets the correction operation start position for the generation of each captured image. In addition, by displacing the correction operation start position, the control unit 50 sets a wide correction range in which shake correction is performed for the movement of the shooting direction. In addition, the control unit 50 moves the lens unit and/or the imaging device, which are displaced, in response to the motion of the image capturing apparatus. Furthermore, a position at the start of exposure is displaced in accordance with the displacement of the correction operation start position. Accordingly, an exposure time period during which a captured image with no image blurring can be generated can be lengthened, compared with a case in which the position at the start of exposure is not displaced. Therefore, the performance of shake correction performed for the shooting direction is improved, and hence shake correction suitable for generating a panoramic image is performed. Accordingly, for example, even if the exposure time is increased, a captured image with no image blurring can be generated. In addition, even if the sweep velocity is high, a captured image with no image blurring can also be generated. In addition, when a panoramic image is generated, a restriction such as the brightness of a subject, a sweep velocity or the like is reduced, and hence a plurality of captured images used for generating the panoramic image can be easily obtained.

In addition, in the panoramic image capturing mode, the control unit 50 sets a displacement amount in response to a shutter speed, and determines the correction operation start position. Therefore, the position of at least one of the lens unit and the imaging device at the start of exposure is displaced in accordance with the displacement of the correction operation start position, and the position at the start of exposure is displaced by a displacement amount, which corresponds to the shutter speed, from a position at which the center of at least one of the lens unit and the imaging device corresponds to the optical axis. In this way, when the position at the start of exposure is displaced in response to the shutter speed, a displacement amount from a position at which the center corresponds to the optical axis is reduced in a case in which the shutter speed is fast, compared with a case in which the shutter speed is slow. Accordingly, when the shutter speed is fast, namely, the exposure time period is short, the position of the correction lens 113a during the exposure time period is located near the optical axis. Therefore, a captured image that has a less degraded image quality with respect to distortion, chromatic aberration, and resolution can be generated.

1-4. Example of Generation Operation of Panoramic Captured Image (When Sweep Operation is Performed in Right Direction)

Next, an example of the generation operation of a panoramic captured image, for example, a specific operation performed in a case in which a sweep operation is performed in a right direction to generate a panoramic captured image, will be described.

When the image capturing mode of the image capturing apparatus 10 is set to a panoramic image capturing mode and a sweep operation is performed in a right direction, a user sweeps the direction of the image capturing apparatus 10 (shooting direction) in a right direction indicated by an arrowed line A, as illustrated in FIG. 11.

When the image capturing mode is set to the panoramic image capturing mode and the sweep operation is performed in the right direction, the control unit 50 provides a display that indicates a sweep direction on the display unit 32, for example. In addition, the control unit 50 moves the position of the correction lens 113a by a displacement amount, which corresponds to a shutter speed, from the central position in a direction in which the correctable range is enlarged with respect to the sweep operation, and hence sets the correction operation start position. In addition, the control unit 50 causes a shake correction operation to be started from the correction operation start position.

After that, the control unit 50 starts a shutter operation to perform the panoramic image capturing processing operation. FIGS. 12A to 12C are diagrams for explaining the panoramic image capturing processing operation. FIG. 12A illustrates the motion of the correction lens 113a. The control unit 50 drives the correction lens 113a, which is located at the correction operation start position, in response to the motion detection signal. Accordingly, the correction lens 113a moves from the correction operation start position in a left direction so as to prevent the shake of an image due to the sweep operation in the right direction.

In addition, as described above, the control unit 50 starts an exposure operation at the start of a correction operation or after the start of the correction operation, and generates a captured image. Furthermore, during an exposure time period, the control unit 50 puts a shake correction operation into an operating state, and drives the correction lens 113a in response to the motion detection signal. Accordingly, by moving the correction lens 113a in response to the motion of the image capturing apparatus, the control unit 50 corrects the shake of an optical image formed on the imaging surface of the imaging device 21. Accordingly, in the image capturing apparatus 10, as illustrated in FIG. 12B, even if the sweep operation is performed in the right direction, a captured image PG1 in which no image blurring occurs can be generated. In addition, since the correction operation start position of the correction lens 113a is displaced from the central position in the right direction, the correction range in which shake correction is performed for the movement of the shooting direction is enlarged, compared with a case in which the correction operation start position is not displaced. Accordingly, when the sweep velocity in the case in which the correction operation start position is displaced is equal to that in the case in which the correction operation start position is not displaced, by displacing a position at the start of exposure in accordance with the displacement of the correction operation start position, an exposure time period during which a captured image with no image blurring can be generated can be lengthened, compared with a case in which the position at the start of exposure is not displaced. In addition, when the sweep velocity in the case in which the position at the start of exposure is displaced is equal to that in the case in which the position at the start of exposure is not displaced, by displacing the position at the start of exposure, a sweep velocity at which a captured image with no image blurring can be generated can be increased, compared with a case in which the position at the start of exposure is not displaced.

When the shutter operation has not been terminated at the time one captured image is generated, the control unit 50 returns the position of the correction lens 113a to the correction operation start position during a period between the exposure time period for the captured image PG1 and an exposure time period for a subsequent image to be captured. After that, the control unit 50 drives again the correction lens 113a from the correction operation start position in response to the motion detection signal. In addition, in FIG. 12A, a time period during which an operation for returning the position of the correction lens 113a to the correction operation start position is performed is indicated as a time period RP. In this way, the position of the correction lens 113a is returned to the correction operation start position, and the correction lens 113a is driven again in response to the motion detection signal. Accordingly, even if the image capturing apparatus 10 is swept, a captured image PG2 in which no image blurring occurs can be generated.

Figure 13:
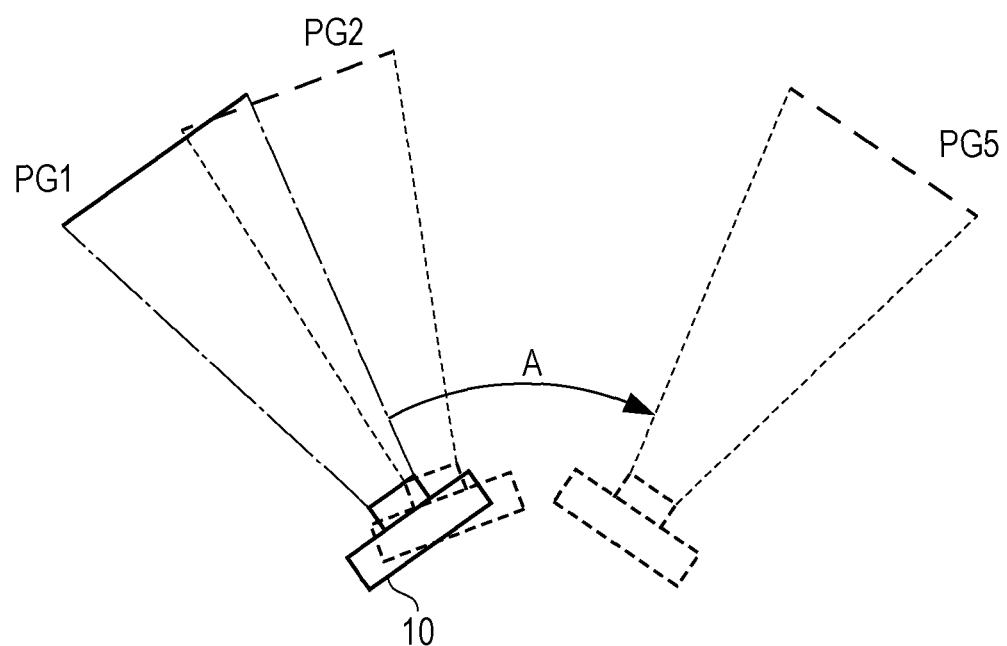
FIG. 13 is a diagram for explaining a captured image generated when a sweep operation is performed in a right direction.
Figure 14:
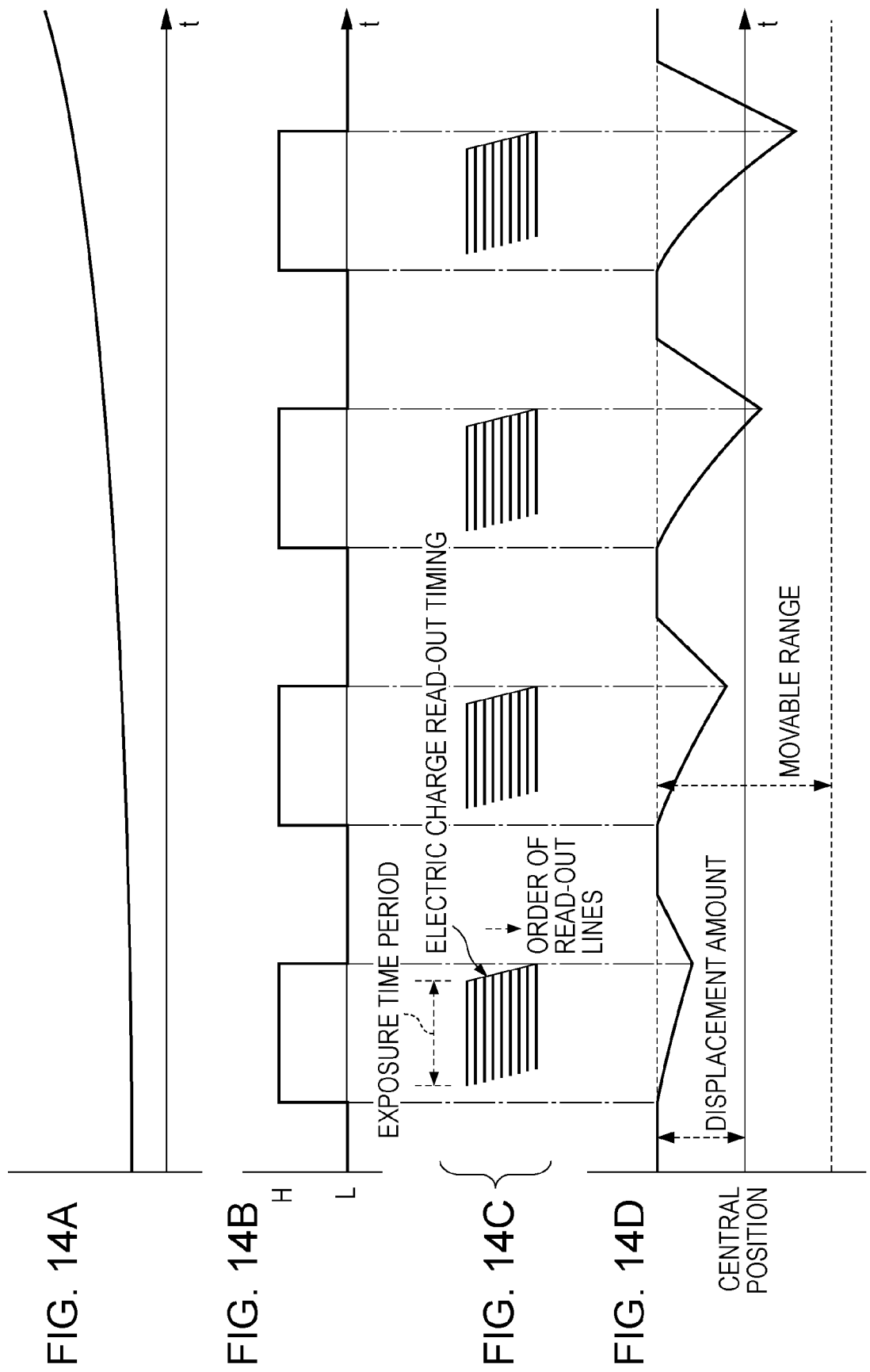
FIGS. 14A to 14D are diagrams for explaining an operation performed when an offset amount is switched in response to a shutter speed (when the shutter speed is slow)
Figure 15:
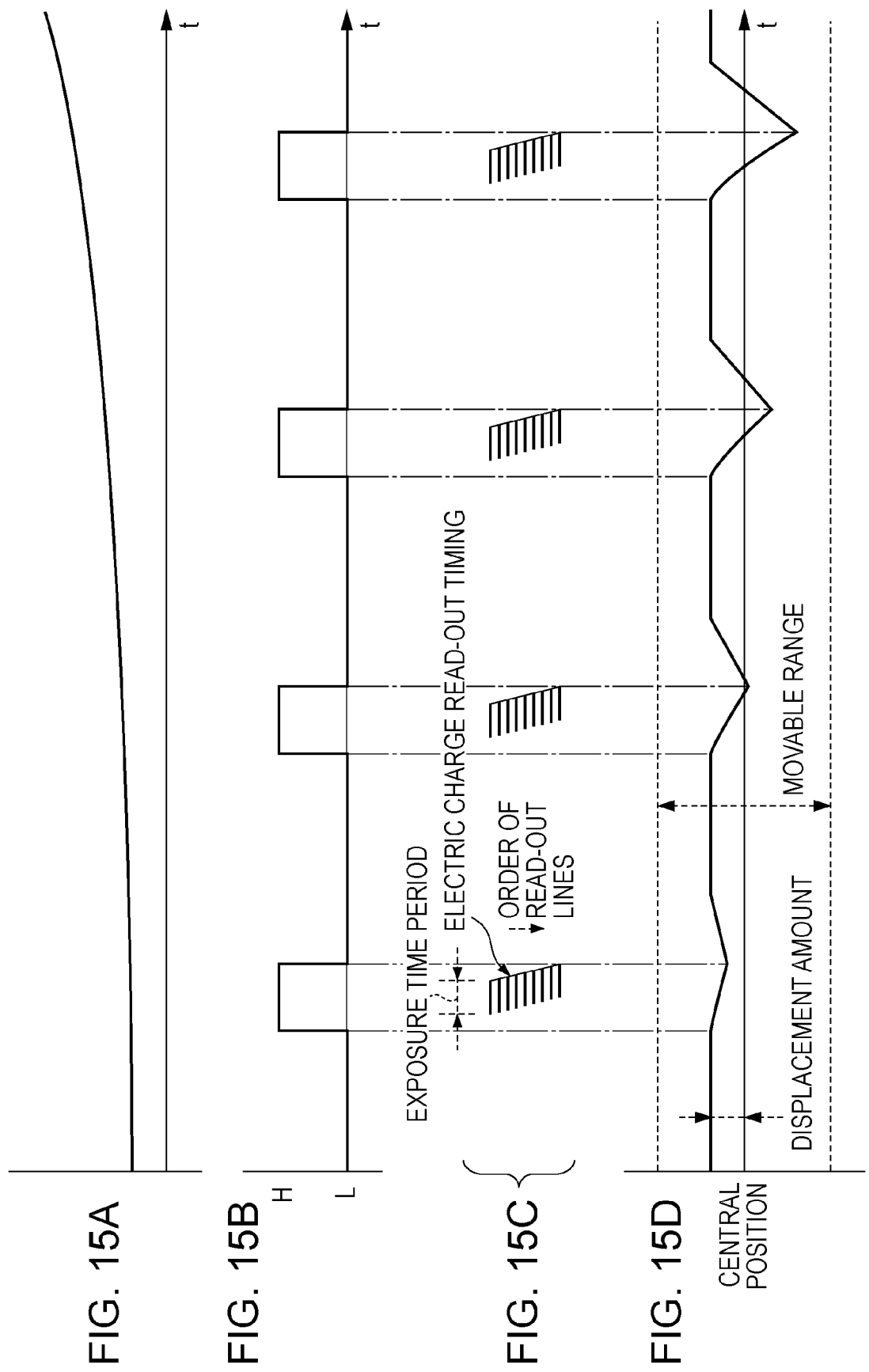
FIGS. 15A to 15D are diagrams for explaining an operation performed when the offset amount is switched in response to the shutter speed (when the shutter speed is high)

When the above-mentioned processing operation is repeatedly performed, and, for example, at the time of the generation of a captured image PG5, the control unit 50 determines that the shutter operation has been terminated, the control unit 50 terminates the image capturing processing operation. Consequently, as illustrated in FIG. 13, the captured images PG1 to PG5 sequentially generated turn out to be images, the shooting directions for which have been sequentially switched in the right direction.

In this way, when the shooting direction is moved in the right direction in the panoramic image capturing mode, the control unit 50 displaces the correction lens 113a in the right direction, and hence the correction range in which shake correction is performed for the movement of the shooting direction is enlarged. In addition, in this state, the control unit 50 displaces at least one of the lens unit and the imaging device in response to a motion detected by the motion detection sensor. Therefore, even if an exposure time period is lengthened owing to the insufficient light amount of a subject, a captured image in which no image blurring occurs can be generated. In addition, even if the sweep velocity in the right direction is high, a captured image in which no image blurring occurs can be generated. Furthermore, a restriction such as the brightness of the subject, the sweep velocity or the like is reduced, and hence the panoramic image can be easily generated.

The signal processing unit 24 calculates a motion vector from the captured images PG1 to PG5 sequentially generated, or detects a motion vector on the basis of a motion detection signal. In addition, on the basis of the motion vector, the signal processing unit 24 adjusts the positions of the captured images PG1 to PG5 so that the images of the subject overlap one another, and synthesizes the captured images PG1 to PG5, thereby generating a panoramic image illustrated in FIG. 12C, the image capturing range of which is wider than that of one captured image.

FIGS. 14A to 15D illustrate operations performed when the correction operation start position is displaced by displacement amounts based on shutter speeds, and FIGS. 16A to 16D illustrate an operation performed when the displacement amount is set to maximum regardless of the shutter speed.

FIGS. 14A, 15A, and 16A illustrate motion detection signals from the motion detection unit 42. FIGS. 14B, 15B, and 16B illustrate shake correction request flags, and, during time periods when the flags are high, the position of the correction lens 113a is controlled in response to the motion detection signals so as to perform shake correction. FIGS. 14C, 15C, and 16C illustrate charge read operations performed when a complementary metal oxide semiconductor (CMOS) type imaging unit is used. FIGS. 14D, 15D, and 16D illustrate the positions of the correction lens 113a with respect to correction directions. In addition, in FIGS. 14D, 15D, and 16D, dashed lines indicate the movable range of the correction lens 113a.

When the shutter speed is slow (an exposure time period is long), the control unit 50 increases the displacement amount of the correction operation start position, compared with a case in which the shutter speed is fast (the exposure time period is short). For example, as illustrated in FIG. 14D, the displacement amount is increased up to the limit position of the movable range. In the case in which the displacement amount is increased in this way, even if the exposure time period is long as illustrated in FIG. 14C, the correction lens 113a can be moved in response to a sweep operation as illustrated in FIG. 14D.

Figure 16:
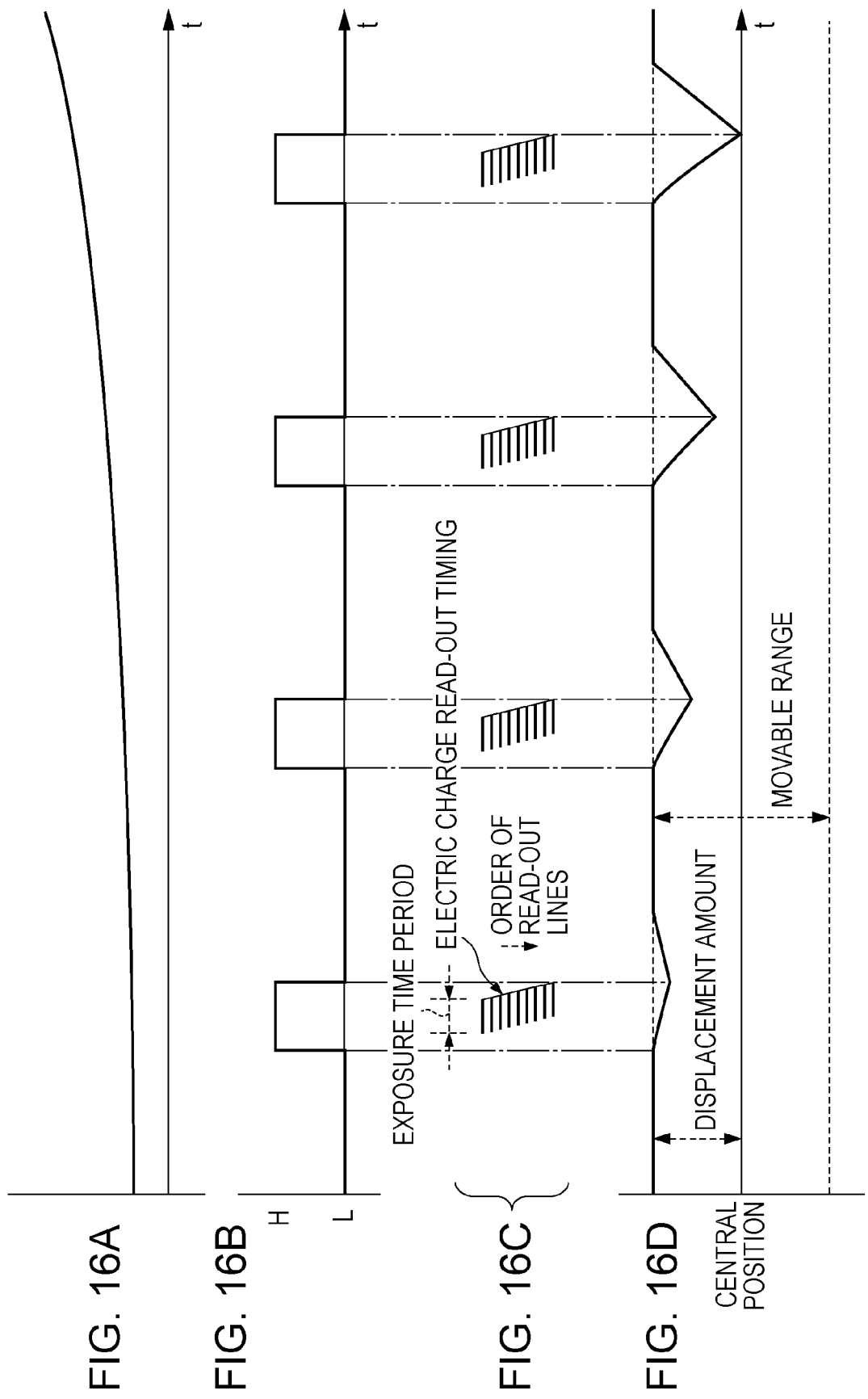
FIGS. 16A to 16D are diagrams for explaining an operation performed when the offset amount is set to maximum regardless of the shutter speed.

When the shutter speed is fast (the exposure time period is short), the control unit 50 decreases the displacement amount of the correction operation start position, as illustrated in FIG. 15D, compared with a case in which the shutter speed is slow. In the case in which the displacement amount is decreased in this way, the position of the correction lens 113a during the exposure time period is located near the central position, compared with a case in which the displacement amount is large as illustrated in FIG. 16D. Consequently, a captured image which has a less degraded image quality with respect to distortion, chromatic aberration, and resolution can be obtained, compared with a case in which a position at the start of exposure corresponds to a large displacement amount regardless of the shutter speed, as illustrated in FIG. 16.

In addition, since the captured image which has a less degraded image quality with respect to distortion, chromatic aberration, and resolution can be obtained, for example, the calculation of a motion vector from a captured image can be accurately and easily performed when a panoramic image is generated. In addition, regarding the panoramic image synthesized from captured images, an image which has a less degraded image quality with respect to distortion, chromatic aberration, and resolution can also be obtained.

2. Second Embodiment

Next, a second embodiment will be described. In the second embodiment, a case in which the motion of the image capturing apparatus is obvious is illustrated. When the generation of a captured image is performed using the image capturing apparatus, an image capturing operation using a camera platform is also performed, in addition to an image capturing operation in which the image capturing apparatus is held in a user's hand. In addition, the shooting direction of the image capturing apparatus is also automatically moved using the camera platform. In the case in which the shooting direction of the image capturing apparatus is automatically moved using the camera platform in this way, if the image capturing apparatus has a movement control information that indicates in which direction the shooting direction is moved and how fast the shooting direction is moved (or rotated) when the image capturing operation is performed, the motion of the image capturing apparatus can be determined using no motion detection signal from the motion detection sensor. Consequently, the image capturing apparatus generates a lens control signal and a position control signal on the basis of the movement control information, and hence, in the same way as in the first embodiment, the image capturing apparatus can correct a shake due to the motion of the image capturing apparatus. Therefore, the image capturing apparatus can generate a plurality of captured images used for generating a panoramic image.

2-1. Configuration of Image Capturing Apparatus

Figure 17:
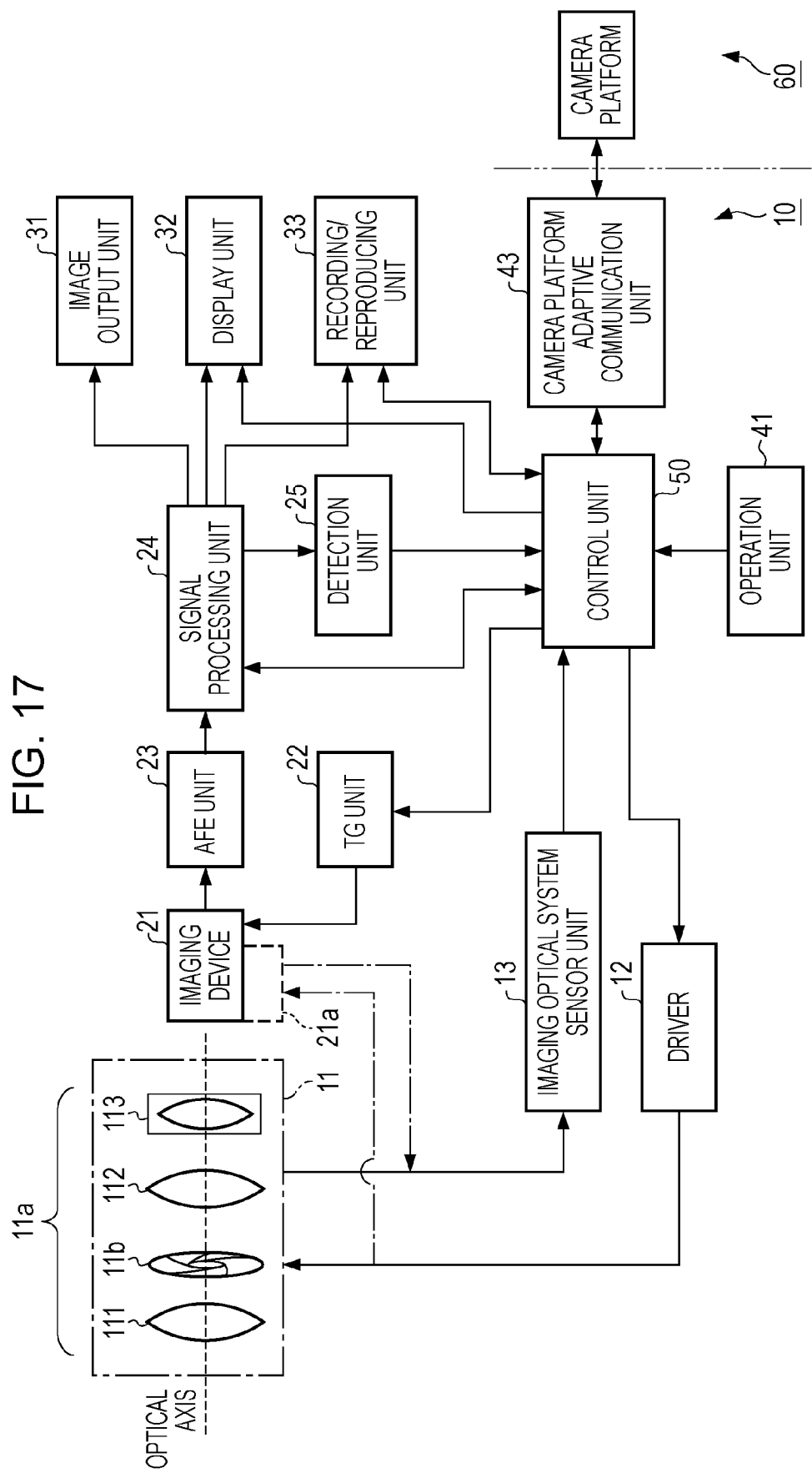
FIG. 17 is a diagram illustrating a configuration of a second embodiment.

FIG. 17 is a diagram illustrating the configuration of the second embodiment, and illustrates a case in which the shooting direction is moved using the camera platform. In addition, in FIG. 17, the same symbol is assigned to a part that corresponds to that in FIG. 1.

An image capturing apparatus 10a includes the imaging optical system block 11, the driver 12, the imaging optical system sensor unit 13, the imaging device 21, the timing signal generation (TG) unit 22, the analog front end (AFE) unit 23, the signal processing unit 24, and the detection unit 25. Furthermore, the image capturing apparatus 10 includes the image output unit 31, the display unit 32, the recording/reproducing unit 33, the operation unit 41, a camera platform adaptive communication unit 43, and a control unit 50a.

As mentioned above, the imaging optical system block 11 includes the lens unit 11a and the aperture mechanism 11b. The lens unit 11a includes the zoom lens 111, the focusing lens 112, and the correction lens unit 113.

On the basis of a lens control signal from the control unit 50a described later, the driver 12 drives the zoom lens 111 or the focusing lens 112 and the actuator of the correction lens unit 113. In addition, the driver 12 drives the aperture mechanism 11b on the basis of a aperture control signal from the control unit 50a.

The imaging optical system sensor unit 13 detects the lens position of the zoom lens 111 or the focusing lens 112, the displacement state of the correction lens unit 113 (equal to the displacement position or the correction angle of the correction lens unit 113) and the setting position of the aperture mechanism 11b, and supplies a position signal to the control unit 50a.

The imaging device 21 converts an optical image formed on the imaging surface by the imaging optical system block 11 into an electric signal and outputs the electric signal to the AFE unit 23.

The TG unit 22 generates various types of driving pulses necessary for outputting the electric signal, which indicates the captured image, from the imaging device 21 and an electronic shutter pulse used for controlling a charge accumulation time of the imaging device 21.

With respect to the electric signal (image signal) output from the imaging device 21, the AFE unit 23 performs a noise eliminating processing operation, a gain control processing operation, and a processing operation for converting an analog captured-image signal, subjected to the noise eliminating processing operation and the gain control processing operation, into a digital signal.

The signal processing unit 24 performs a camera signal preprocessing operation, a cameral signal processing operation, a resolution conversion processing operation, a compression/expansion processing operation, or the like. Furthermore, when a panoramic image is generated in the image capturing apparatus 10a, the signal processing unit 24 calculates a motion vector using captured images, and synthesizes a plurality of captured images using the calculated motion vector so that images of the same subject overlap one another, thereby generating a panoramic image. In addition, the synthesis of captured images may be performed using information that indicates the moving velocity and the direction of the shooting direction. In this case, even if a correct motion vector is not obtained, the plurality of captured images can be synthesized so that the images of the same subject overlap one another.

The detection unit 25 detects the brightness level or the focusing state of a subject using the captured-image signal supplied to the signal processing unit 24, and generates and supplies a detection signal, which indicates the brightness level or the focusing state, to the control unit 50a.

The image output unit 31 converts the image signal processed by the signal processing unit 24 into an image signal with a format corresponding to an external device connected to the image capturing apparatus 10 and outputs the image signal.

The display unit 32 displays the image captured by the image capturing apparatus 10 or the captured image reproduced by the recording/reproducing unit 33. In addition, the display unit 32 performs a menu display for the setting of the imaging device 10 or the like.

The recording/reproducing unit 33 records the image signal or the encoded signal of the captured image, output from the signal processing unit 24, on the recording medium. In addition, the recording/reproducing unit 33 performs a processing operation for reading and supplying the image signal recorded on the recording medium to the image output unit 31 or the display unit 32, or a processing operation for reading and supplying the encoded signal recorded on the recording medium to the signal processing unit 24.

The operation unit 41 generates and supplies an operation signal corresponding to a user operation to the control unit 50a.

The camera platform adaptive communication unit 43 includes a configuration that allows a communication signal to be transmitted to and received from a communication unit in the camera platform 60 using a wire or wireless communication, for example, in a state in which the image capturing apparatus 10a is mounted on the camera platform 60. The camera platform adaptive communication unit 43 performs communication with the image capturing apparatus 10a, which complies with a predetermined communication method.

The control unit 50a includes a central processing unit (CPU) and a memory or the like. In the memory, a program to be executed by the CPU and a variety of data are stored. As the memory, for example, a non-volatile memory such as an electronically erasable and programmable ROM (EEPROM), a flash memory or the like is used. The CPU in the control unit 50a executes the program stored in the memory, and, on the basis of the variety of data stored in the memory or the operation signal supplied from the operation unit 41, controls individual units so that the action of the image capturing apparatus 10a becomes the action corresponding to the user operation. For example, when the user performs a shutter operation, the control unit 50a controls the action of the TG unit 22 or the like and causes an encoded signal or the like of a still image captured with a desired shutter speed to be recorded on the recording medium in the recording/reproducing unit 33. In addition, when a moving image recording starting operation is performed, an encoded signal of a moving image or the like is recorded on the recording medium in the recording/reproducing unit 33.

In addition, when the user performs a mode selection operation, the control unit 50a performs an image capturing operation or the like in a mode selected by the user. In addition, on the basis of the position signal supplied from the imaging optical system sensor unit 13 or the detection signal supplied from the detection unit 25, the control unit 50a generates and supplies a lens control signal or an aperture control signal to the driver 12. Accordingly, the focusing lens 112 or the aperture mechanism 11b is driven by the driver 12 so that a captured image, which is focused with a desired brightness, is obtained. In addition, when the user performs a zoom operation, the control unit 50a generates and supplies the lens control signal to the driver 12 and hence drives the zoom lens 111 so that a captured image with a desired zoom ratio is obtained.

Furthermore, when, with the image capturing apparatus 10a being mounted on the camera platform 60 and the shooting direction thereof being moved, a plurality of captured images are generated, the control unit 50a displaces correction operation start positions for each captured image in the lens unit and/or the imaging device which are to be displaced, in a direction based on a direction in which the shooting direction is moved. In addition, the control unit 50a displaces at least one of the correction lens and the imaging device in response to the motion of the image capturing apparatus 10a, thereby correcting the shake of an optical image formed on the imaging surface of the imaging device, which occurs in response to the motion of the image capturing apparatus. In addition, the control unit 50a displaces the correction operation start positions for each captured image in the lens unit and/or the imaging device which are to be displaced, in a direction based on a direction in which the shooting direction is moved, and hence enlarges a correction range in which shake correction is performed for the movement of the shooting direction.

In addition, in the following description, a case in which, by displacing the correction lens, shake correction is performed for the motion of the image capturing apparatus will be described.

2-2. Configuration of Camera Platform

Figure 18:
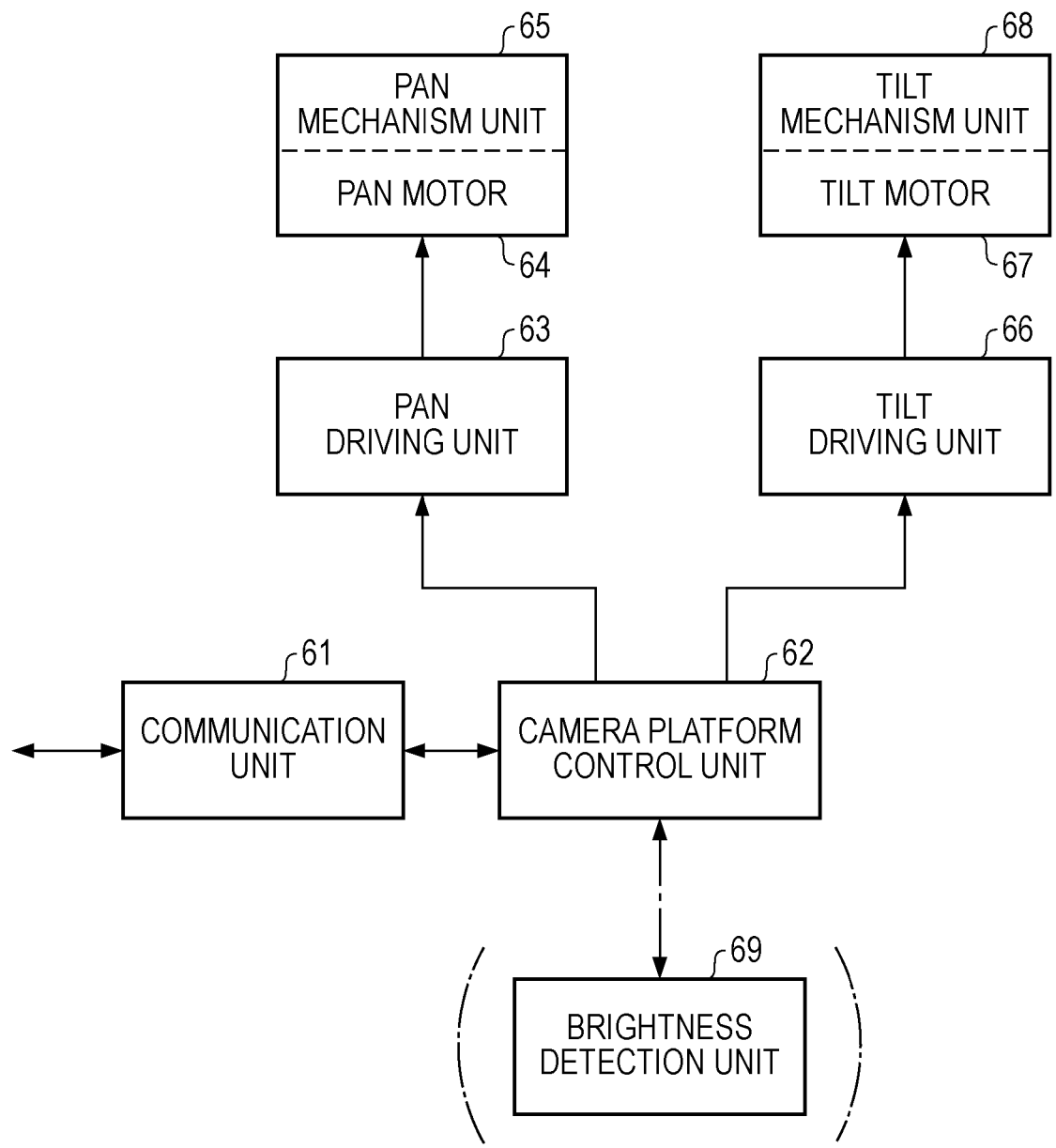
FIG. 18 is a diagram illustrating a configuration of a camera platform.

FIG. 18 is a block diagram illustrating the configuration of the camera platform. The camera platform 60 includes a pan/tilt mechanism, and, as parts corresponding to the pan/tilt mechanism, includes a pan motor 64, a pan mechanism unit 65, a tilt motor 67, and a tilt mechanism unit 68.

The communication unit 61 is configured so as to correspond to the camera platform adaptive communication unit 43, and performs, using a wire or wireless communication, communication with the camera platform adaptive communication unit 43 in the image capturing apparatus 10a mounted on the camera platform 60 in accordance with the predetermined communication method.

A camera platform control unit 62 includes a CPU and a memory or the like. The CPU in the camera platform control unit 62 executes a program stored in the memory, and causes the camera platform 60 to perform a pan operation or a tilt operation. When the pan operation is performed, the camera platform control unit 62 outputs a pan operation control signal to a pan driving unit 63. In addition, when the tilt operation is performed, the camera platform control unit 62 outputs a tilt operation control signal to a tilt driving unit 66.

On the basis of the pan operation control signal, the pan driving unit 63 generates and outputs a motor drive signal to the pan motor 64. In addition, on the basis of the tilt operation control signal, the driving unit 66 generates and outputs a motor drive signal to the tilt motor 67.

The pan motor 64 is equipped in the pan mechanism unit 65 used for adding a pan (horizontal) direction motion to the image capturing apparatus 10*a* mounted on the camera platform 60. By sweeping in a positive direction or an inverse direction on the basis of the motor drive signal, the pan motor 64 adds the pan direction motion to the image capturing apparatus 10*a* using the pan mechanism unit 65.

The tilt motor 67 is equipped in the tilt mechanism unit 68 used for adding a tilt (vertical) direction motion to the image capturing apparatus 10*a* mounted on the camera platform 60. By sweeping in a positive direction or an inverse direction on the basis of the motor drive signal, the tilt motor 67 adds the tilt direction motion to the image capturing apparatus 10*a* using the tilt mechanism unit 68.

2-3. Operation Performed in Image Capturing Apparatus

Figure 19:
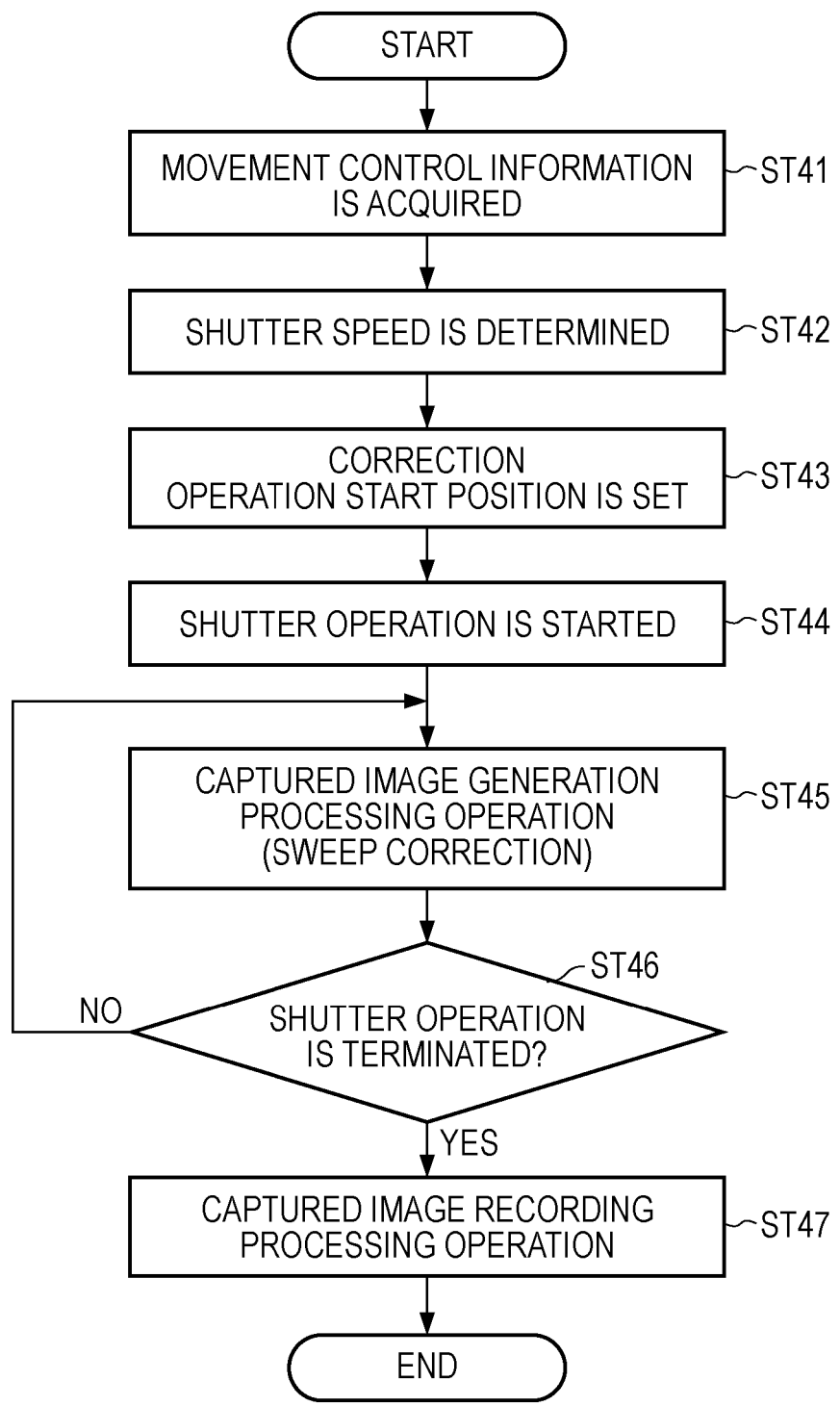
FIG. 19 is a flowchart illustrating an operation performed in the second embodiment.

FIG. 19 is a flowchart illustrating an operation performed in the second embodiment. In Step ST41, the control unit 50*a* acquires the movement control information. The control unit 50*a* acquires the movement control information that indicates in which direction the shooting direction is moved and how fast the shooting direction is moved (or rotated) when the image capturing operation is performed, and proceeds to Step ST42. The movement control information may be preliminarily stored in the image capturing apparatus 10*a*, or may be generated in response to a user operation. In addition, a configuration may be adopted in which the movement control information is acquired from the camera platform 60 by communicating with the camera platform 60. Furthermore, the image capturing apparatus 10*a* or the camera platform 60 may automatically determine the moving velocity of the shooting direction. For example, since the detection unit 25 in the image capturing apparatus 10*a* detects the brightness level of a subject, the moving velocity of the shooting direction is set in response to the detected brightness level. Here, when the exposure time period of the imaging device is varied to generate a captured image that has desired brightness, the exposure time period is lengthened with decrease in the brightness of an image to be captured. Accordingly, when the subject is dark, the moving velocity of the shooting direction is decreased so that a captured image, for which shake correction for the motion of the image capturing apparatus 10*a* is performed, can be obtained even if the exposure time period is lengthened. In addition, as illustrated in FIG. 18, a configuration may be adopted in which a brightness detection sensor 69 is provided in the camera platform 60, and the camera platform 60 or the image capturing apparatus 10*a* sets the moving velocity of the shooting direction in response to the brightness of a subject, detected by the brightness detection sensor 69. In this way, the camera platform 60 or the image capturing apparatus 10*a* controls the motion velocity of the image capturing apparatus in response to the detected brightness.

In Step ST42, the control unit 50*a* determines a shutter speed. The control unit 50*a* determines the shutter speed set by the user or the shutter speed preliminarily set, and proceeds to Step ST43. In addition, when the exposure time period is varied in response to the brightness of a subject, the shutter speed is determined from the exposure time period set in response to the brightness of the subject.

In Step ST43, the control unit 50*a* sets a correction operation start position. The control unit 50*a* sets the correction operation start position in the same way as in Step ST13. Namely, the control unit 50*a* displaces the correction lens in the correction lens unit 113 in a direction based on the motion direction of the image capturing apparatus 10*a*, determined on the basis of the movement control information, and hence sets the correction operation start position, thereby enlarging the correctable range of a shake correction. In addition, the control unit 50*a* sets a displacement amount in response to the exposure time period, namely, the shutter speed so that a captured image which has a less degraded image quality with respect to distortion, chromatic aberration, and resolution can be obtained, and proceeds to Step ST44.

In Step ST44, the control unit 50*a* starts a shutter operation and proceeds to Step ST45. Regarding the start of the shutter operation, for example, when the camera platform 60 starts moving the shooting direction, the control unit 50*a* starts the shutter operation.

In Step ST45, the control unit 50*a* performed a captured image generation processing operation. In the same way as in Step ST15, the control unit 50*a* drives the correction lens 113*a*, which is located at the correction operation start position, in response to the moving velocity of the shooting direction, and hence corrects the shake of an optical image, which occurs owing to the motion of the image capturing apparatus. In addition, the control unit 50*a* sets a displacement amount in response to the shutter speed, and determines the correction operation start position. Furthermore, during the exposure time period, the control unit 50*a* puts the shake correction operation into an operating state. Therefore, the control unit 50*a* causes a captured image, in which image blurring due to the motion of the image capturing apparatus 10*a* does not occur and which has a less degraded image quality with respect to distortion, chromatic aberration, and resolution, to be generated, and proceeds to Step ST46.

In Step ST46, the control unit 50*a* determines whether or not the shutter operation has been terminated. When the camera platform 60 stops moving the shooting direction, or the movement distance of the shooting direction reaches a predetermined amount, the control unit 50*a* determines that the shutter operation has been terminated, and proceeds to Step ST47. In addition, when it is determined that the shutter operation has not been terminated yet, the control unit 50*a* returns the position of the correction lens 113*a* to the correction operation start position, and returns to Step ST45. When returning from Step ST46 to Step ST45, the control unit 50*a* returns the position of the correction lens 113*a* to the correction operation start position during a period between the exposure time period for the captured image and an exposure time period for a subsequent image to be captured. After that, the control unit 50*a* drives again the correction lens 113*a* in response to the moving velocity of the shooting direction, and generates an image in which no image blurring due to the motion of the image capturing apparatus 10*a* occurs and which has a less degraded image quality with respect to distortion, chromatic aberration, and resolution.

In Step ST47, the control unit 50*a* performs a captured image synthesis processing operation. By controlling the signal processing unit 24, the control unit 50*a* calculates the motion vector using a plurality of captured images generated in the processing operations performed in Step ST45 and Step ST46. In addition, on the basis of the calculated motion vector, the control unit 50a synthesizes the plurality of captured images so that the images of the same subject overlap one another, and hence generates a panoramic image, the image capturing range of which is wider than that of one captured image, from the plurality of captured images. After that, the control unit 50a terminates the panoramic captured image synthesis processing operation.

In Step ST47, the control unit 50a causes the recording/reproducing unit 33 to record a captured image generated in Step ST45 in a recording medium.

In this way, in the panoramic image capturing mode, the control unit 50a displaces at least one of the lens unit and the imaging device in a direction based on a direction in which the shooting direction is moved, and hence sets the correction operation start position for the generation of each captured image, thereby enlarging the correction range in which shake correction is performed for the movement of the shooting direction. In addition, the control unit 50a moves the lens unit and/or the imaging device, which are displaced, in response to the motion of the image capturing apparatus. Therefore, even if the image capturing apparatus 10a is mounted on the camera platform 60, and the shooting direction is moved using the camera platform 60, the performance of shake correction performed for the shooting direction is improved, and hence shake correction suitable for generating a panoramic image is performed. Accordingly, regardless of the exposure time and the sweep velocity, a captured image with no image blurring can be generated. Accordingly, when a panoramic image is generated, a restriction such as the brightness of a subject, a sweep velocity or the like is reduced, and hence the generation of the panoramic image can be easily performed.

In addition, in the panoramic image capturing mode, the control unit 50a sets a displacement amount in response to a shutter speed, and determines the correction operation start position. At this time, the position of at least one of the lens unit and the imaging device at the start of exposure is displaced in accordance with the displacement of the correction operation start position, and the position at the start of exposure is displaced by a displacement amount, which corresponds to the shutter speed, from a position at which the center of at least one of the lens unit and the imaging device corresponds to the optical axis. Therefore, even in a case in which the image capturing apparatus 10a is mounted on the camera platform 60, and the shooting direction is moved using the camera platform 60, when the shutter speed is fast, the position of the correction lens 113a during the exposure time period can be located near the optical axis. Therefore, a captured image that has a less degraded image quality with respect to distortion, chromatic aberration, and resolution is generated.

In addition, in a case in which the captured image synthesis processing operation is performed in the image capturing apparatus, a step for performing the captured image synthesis processing operation may be provided and a panoramic image generated in the captured image synthesis processing operation may be recorded in a recording medium.

In addition, the present invention is not limited to the embodiments described above. For example, in addition to the shutter speed, the exposure time period changes in accordance with a frame rate at the time of the generation of a plurality of captured images to be synthesized for the generation of a panoramic image. In a case in which the frame rate is variable, and an image signal is generated by reading out accumulated charge that corresponds to one frame period, when the frame rate is high, the exposure time is short, and when the frame rate is low, the exposure time is long. Accordingly, an offset amount may be set in response to the frame rate at the time of the generation of a plurality of captured images to be synthesized. In addition, if a configuration is adopted in which the motion of the image capturing apparatus can be detected, the present invention is not limited to the configuration using the angular speed detection unit or the acceleration speed detection unit as described above. For example, the shake of the image capturing apparatus may be detected from the captured image.

Furthermore, in an image capturing apparatus in which a lens may be replaced, the correction lens may be provided at the lens side or the correction lens may be provided at the main body side of the image capturing apparatus. In addition, for example, the correction lens or the driving unit for driving the correction lens may be provided at the lens side and the other components may be provided at the main body side of the image capturing apparatus. In addition, an imaging device provided at the main body side of the image capturing apparatus may be moved in response to the motion of the image capturing apparatus.

The embodiments of the present invention disclose the present invention in the exemplary form. It is apparent to those skilled in the art that the embodiments may be modified or replaced without departing from the scope of the present invention. That is, in order to determine the spirit of the present invention, claims are considered.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus for controlling an image capturing apparatus, the image capturing apparatus is operable to capture a plurality of images with a shooting direction being moved for generating a panoramic image, the control apparatus comprising
   a circuitry configured
   to cause a driving unit to displace at least one of a lens unit and an imaging device with respect to an optical axis in response to motion of the image capturing apparatus, and
   to cause the driving unit to a displace position of the lens unit and/or the imaging device at a start of exposure of each image to be captured in a direction based on a direction in which the shooting direction is moved; and,
   a displacement amount at the start of the exposure is set in response to a length of an exposure time period such that when the exposure time period has a first exposure time period which is longer than a second exposure time period the displacement amount is set to be larger than that when the exposure time period has the second exposure time period,
   in which the displacement amount represents a distance from a position at which a center of the lens unit and/or the imaging device corresponds to the optical axis is displaced from the optical axis in a plane perpendicular to the optical axis.

2. The control apparatus according to claim 1,
   wherein by causing at least one of the lens unit and the imaging device to be displaced, in response to motion of the image capturing apparatus,
   the circuitry further configured to correct a shake of an optical image formed on an imaging surface of the imaging device, the shake being due to the motion of the image capturing apparatus.

3. The control apparatus according to claim 1,
wherein during the exposure time period for each image to be captured,
the circuitry further configured to put a shake correction operation into an operating state, the shake correction operation being an operation in which, by causing at least one of the lens unit and the imaging device to be displaced, in response to motion of the image capturing apparatus, a shake of an optical image formed on an imaging surface of the imaging device is corrected, the shake being due to the motion of the image capturing apparatus.

4. The control apparatus according to claim 3,
wherein during a period between the exposure time period for the image to be captured and an exposure time period for a subsequent image to be captured, the circuitry further configured to return the positions of the lens unit and/or the imaging device to positions at the start of the exposure.

5. The control apparatus according to claim 1,
wherein the circuitry further configured to determine the motion of the image capturing apparatus according to movement control information for a camera platform configured to move the shooting direction of the image capturing apparatus.

6. The control apparatus according to claim 1,
wherein the exposure time period corresponds to a shutter speed.

7. The control apparatus according to claim 1,
wherein the circuitry further configured to set the exposure time period on the basis of a frame rate.

8. The control apparatus according to claim 1,
wherein the image captured by the imaging device is more degraded when the displacement is first value than in second value which is smaller than the first value.

9. The control apparatus according to claim 1,
wherein the motion of the imaging apparatus is horizontally.

10. A method to control an image capturing apparatus comprising the steps of:
displacing at least one of a lens unit and an imaging device with respect to an optical axis in response to motion of the image capturing apparatus,
wherein, with a shooting direction being moved, a plurality of captured images are generated, the plurality of captured images are used for generating a panoramic image,
a displacement position of the lens unit and/or the imaging device at a start of exposure of each image to be captured are determined in a direction based on a direction in which the shooting direction is moved; and,
a displacement amount at the start of the exposure is set in response to a length of an exposure time period such that when the exposure time period has a first exposure time period which is longer than a second exposure time period the displacement amount is set to be larger than that when the exposure time period has the second exposure time period,
in which the displacement amount represents a distance from a position at which a center of the lens unit and/or the imaging device corresponds to the optical axis is displaced from the optical axis in a plane perpendicular to the optical axis.

11. The method according to claim 10,
wherein by causing at least one of the lens unit and the imaging device to be displaced, in response to motion of the image capturing apparatus,
and the method further comprising the step of:
correcting a shake of an optical image formed on an imaging surface of the imaging device, the shake being due to the motion of the image capturing apparatus.

12. The method according to claim 10, further comprising the step of:
putting a shake correction operation into an operating state during the exposure time period for each image to be captured, the shake correction operation being an operation in which, by causing at least one of the lens unit and the imaging device to be displaced, in response to motion of the image capturing apparatus, a shake of an optical image formed on an imaging surface of the imaging device is corrected, the shake being due to the motion of the image capturing apparatus.

13. The method according to claim 12, further comprising the step of:
returning the positions of the lens unit and/or the imaging device to positions at the start of the exposure during a period between the exposure time period for the image to be captured and an exposure time period for a subsequent image to be captured.

14. The method according to claim 10, further comprising the step of:
setting the exposure time period on the basis of a frame rate.

15. A non-transitory computer-readable medium storing computer-readable instructions thereon which when executed by a computer cause the computer to perform a method, the method comprising:
displacing at least one of a lens unit and an imaging device with respect to an optical axis in response to motion of the image capturing apparatus,
wherein, with a shooting direction being moved, a plurality of captured images are generated, the plurality of captured images are used for generating a panoramic image,
a displacement position of the lens unit and/or the imaging device at a start of exposure of each image to be captured are determined in a direction based on a direction in which the shooting direction is moved; and,
a displacement amount at the start of the exposure is set in response to a length of an exposure time period such that when the exposure time period has a first exposure time period which is longer than a second exposure time period the displacement amount is set to be larger than that when the exposure time period has the second exposure time period,
in which the displacement amount represents a distance from a position at which a center of the lens unit and/or the imaging device corresponds to the optical axis is displaced from the optical axis in a plane perpendicular to the optical axis.

16. An image capturing apparatus comprising:
an imaging device; and
a circuitry configured
to cause a driving unit to displace at least one of a lens unit and the imaging device with respect to an optical axis in response to motion of the image capturing apparatus,
wherein, with a shooting direction being moved, a plurality of captured images are generated, the plurality of captured images are used for generating a panoramic image,
and to cause the driving unit to a displace position of the lens unit and/or the imaging device at a start of exposure of each image to be captured in a direction based on a direction in which the shooting direction is moved; and,
a displacement amount at the start of the exposure is set in response to a length of an exposure time period such that when the exposure time period has a first exposure time period which is longer than a second exposure time period the displacement amount is set to be larger than that when the exposure time period has the second exposure time period, in which the displacement amount represents a distance from a position at which a center of the lens unit and/or the imaging device corresponds to the optical axis is displaced from the optical axis in a plane perpendicular to the optical axis.

17. The capturing apparatus according to claim 16,
wherein by causing at least one of the lens unit and the imaging device to be displaced, in response to motion of the image capturing apparatus,
the circuitry further configured to correct a shake of an optical image formed on an imaging surface of the imaging device, the shake being due to the motion of the image capturing apparatus.

18. The image capturing apparatus according to claim 16,
wherein during the exposure time period for each image to be captured,
the circuitry further configured to put a shake correction operation into an operating state, the shake correction operation being an operation in which, by causing at least one of the lens unit and the imaging device to be displaced, in response to motion of the image capturing apparatus, a shake of an optical image formed on an imaging surface of the imaging device is corrected, the shake being due to the motion of the image capturing apparatus.

19. The image capturing apparatus according to claim 18,
wherein during a period between the exposure time period for the image to be captured and an exposure time period for a subsequent image to be captured, the circuitry further configured to return the positions of the lens unit and/or the imaging device to positions at the start of the exposure.

20. The image capturing apparatus according to claim 16,
wherein the exposure time period corresponds to a shutter speed.

* * * * *